(12) United States Patent
Fujita et al.

(10) Patent No.: US 12,442,760 B2
(45) Date of Patent: Oct. 14, 2025

(54) OPTICAL MODULE AND MULTIFOCAL OPTICAL DEVICE

(71) Applicant: OSAKA UNIVERSITY, Osaka (JP)

(72) Inventors: Katsumasa Fujita, Osaka (JP); Kazuki Bando, Osaka (JP); Hiroyuki Kawagoe, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 225 days.

(21) Appl. No.: 18/268,785

(22) PCT Filed: Nov. 24, 2021

(86) PCT No.: PCT/JP2021/043017
§ 371 (c)(1),
(2) Date: Jun. 21, 2023

(87) PCT Pub. No.: WO2022/137959
PCT Pub. Date: Jun. 30, 2022

(65) Prior Publication Data
US 2024/0053258 A1 Feb. 15, 2024

(30) Foreign Application Priority Data
Dec. 22, 2020 (JP) ................... 2020-212034

(51) Int. Cl.
*G01N 21/31* (2006.01)
*G02B 3/00* (2006.01)
(Continued)

(52) U.S. Cl.
CPC ........... *G01N 21/31* (2013.01); *G02B 3/0037* (2013.01); *G02B 7/021* (2013.01); *G02B 27/10* (2013.01); *G01N 2201/08* (2013.01)

(58) Field of Classification Search
CPC ............. G01J 2003/1213; G01J 3/0202; G01J 3/0208; G01J 3/0218; G01J 3/44;
(Continued)

(56) References Cited

U.S. PATENT DOCUMENTS 6,686,582 B1 2/2004 Volcker et al.
6,788,842 B1 9/2004 Sink et al.
(Continued)

FOREIGN PATENT DOCUMENTS

CN 111678066 A 9/2020
JP H04270943 A 9/1991
(Continued)

OTHER PUBLICATIONS

Edmund Optics web page- https://www.edmundoptics.com/knowledge-center/application-notes/optics/what-are-beamsplitters/ (Year: 2020).*
(Continued)

*Primary Examiner* — Hina F Ayub
(74) *Attorney, Agent, or Firm* — Lippes Mathias LLP

(57) ABSTRACT

An optical module according to the present embodiment includes: a first lens array unit in which a plurality of first lenses configured to collect irradiating light are arranged; a second lens array unit which includes a plurality of second lenses and on which signal light from the first lenses is incident; and a plurality of beam splitters configured to reflect irradiating light to the first lenses and to transmit the signal light from the first lenses, wherein reflectance of the beam splitter on a nearest side in a travel direction of the irradiating light is set lowest and the more toward a far side in the travel direction, the higher the reflectance of the beam splitters.

20 Claims, 20 Drawing Sheets

(51) Int. Cl.
  *G02B 7/02* (2021.01)
  *G02B 27/10* (2006.01)

(58) Field of Classification Search
  CPC .... G01N 21/31; G01N 2201/08; G02B 27/10; G02B 3/00; G02B 3/0037; G02B 7/021
  See application file for complete search history.

(56) References Cited

U.S. PATENT DOCUMENTS

| | | | |
|---|---|---|---|
| 2007/0161876 A1* | 7/2007 | Bambot | G01J 3/027 600/407 |
| 2009/0252503 A1 | 10/2009 | Ishigami et al. | |
| 2015/0024968 A1* | 1/2015 | Rulison | G02B 13/0085 506/12 |
| 2017/0030835 A1 | 2/2017 | Chan et al. | |
| 2017/0167979 A1 | 6/2017 | Rulison et al. | |
| 2018/0136040 A1 | 5/2018 | Sodeoka et al. | |
| 2020/0249413 A1* | 8/2020 | Maji | G01J 3/42 |
| 2022/0413275 A1* | 12/2022 | Kuwayama | G01J 3/18 |

FOREIGN PATENT DOCUMENTS

| | | |
|---|---|---|
| JP | 2000137220 A | 5/2000 |
| JP | 2009251375 A | 3/2009 |
| JP | 20102579 A | 1/2010 |
| JP | 2010271569 A | 12/2010 |
| JP | 2012237647 A | 12/2012 |
| WO | 2016121946 A1 | 8/2016 |
| WO | 2019244358 A1 | 12/2019 |

OTHER PUBLICATIONS

International Search Report for PCT/JP2021/043017, Mailed Feb. 15, 2022, 3 pages.
Notice of Reasons for Refusal for Japanese Patent Application No. 2022-571992, dated Dec. 12, 2023, 9 pages.

* cited by examiner

OPTICAL MODULE AND MULTIFOCAL OPTICAL DEVICE

TECHNICAL FIELD

The present invention relates to an optical module and a multifocal optical apparatus.

BACKGROUND ART

Patent Literature 1 discloses a multifocal spectroscopic measurement apparatus for making all wells in a multiwell an observation region. The multifocal spectroscopic measurement apparatus according to Patent Literature 1 includes an objective lens array and a spectroscope-side lens array. Two filters are arranged between the objective lens array and the spectroscope-side lens array. Each filter is arranged so as to cover half of the objective lens array. Furthermore, the two filters are inclined by 45 degrees with respect to an optical axis of the objective lenses. In addition, the two filters are arranged so as to be inclined by 90 degrees with respect to each other.

CITATION LIST

Patent Literature

Patent Literature 1: Published Japanese Translation of PCT International Publication for Patent Application, No. 2016-121946

Summary of Invention

Patent Literature 1 enables Raman light from each well of the multiwell to be spectroscopically measured. With such optical apparatuses, there is a desire to make an optical system for forming multiple focal points thinner.

The present disclosure has been made in consideration of the above and an object thereof is to provide an optical module which enables thinning and a multifocal optical apparatus.

An optical module according to the present embodiment is an optical module for forming multiple focal points arranged in first and second directions, the optical module including: a first lens array unit in which a plurality of first lenses configured to collect irradiating light are arranged in the first and second directions in order to form the multiple focal points; a second lens array unit which includes a plurality of second lenses arranged in the first and second directions and on which signal light from the first lenses is incident; a plurality of beam splitters which are arranged between the first lens array unit and the second lens array unit and which are configured to reflect irradiating light traveling in the second direction to the first lenses and to transmit the signal light from the first lenses; a first holder unit arranged between the plurality of beam splitters and the first lens array unit; and a second holder unit arranged between the plurality of beam splitters and the second lens array unit, wherein the plurality of beam splitters are arranged so that the irradiating light traveling in the second direction is sequentially incident on the plurality of beam splitters, each of the beam splitters is arranged to be inclined with respect to an optical axis of the irradiating light, the first holder unit and the second holder unit are configured to hold the plurality of beam splitters, and reflectance of the beam splitter on a nearest side in a travel direction of the irradiating light is set lowest and the more toward a far side in the travel direction, the higher the reflectance of the beam splitters.

Preferably, in the optical module described above, the first holder unit includes a plurality of first inclined portions having a first inclined surface along the beam splitters, the second holder unit includes a plurality of second inclined portions having a second inclined surface along the beam splitters, the beam splitters are held between the first inclined surface and the second inclined surface, the first inclined portion has a first holding surface which is a different surface from the first inclined surface, the second inclined portion has a second holding surface which is a different surface from the second inclined surface, and a laser line filter configured to transmit laser light that is the irradiating light is held between the first holding surface and the second holding surface.

Preferably, in the optical module described above, the beam splitters are dichroic mirrors, and the dichroic mirrors are configured to transmit the signal light.

Preferably, the optical module described above further includes an elastic member arranged between the first inclined surface or the second inclined surface and the beam splitters.

Preferably, in the optical module described above, an edge portion of the beam splitters is cut so that a side end surface of the beam splitters becomes orthogonal to the second direction.

In the optical module described above, the beam splitter on a nearest side in the travel direction of the irradiating light may be closest to the first lenses and the more toward a far side in the travel direction, the more distant the beam splitters may become from the first lenses.

A multifocal optical apparatus according to the present embodiment includes: the optical module described above, a light source configured to generate the irradiating light; and a fiber bundle having a plurality of fibers on which signal light collected by the second lenses is incident.

A multifocal optical apparatus according to the present embodiment includes: the optical module described above, a light source configured to generate the irradiating light; and a two-dimensional array photodetector configured to detect signal light collected by the second lenses.

A multifocal optical apparatus according to the present embodiment includes: a light source configured to generate irradiating light; an optical module configured to form multiple focal points arranged in first and second directions using the irradiating light; and a fiber bundle having a plurality of fibers on which signal light from the optical module is incident, wherein the optical module includes: a first lens array unit in which a plurality of first lenses configured to collect irradiating light are arranged in the first and second directions in order to form the multiple focal points; a second lens array unit which includes a plurality of second lenses arranged in the first and second directions and which is configured to collect signal light incident from the first lenses; and a plurality of beam splitters which are arranged between the first lens array unit and the second lens array unit and which are configured to reflect irradiating light traveling in the second direction to the first lenses and to transmit the signal light from the first lenses, the plurality of beam splitters being arranged so that the irradiating light traveling in the second direction is sequentially incident on the plurality of beam splitters, each of the beam splitters being arranged to be inclined with respect to an optical axis of the irradiating light, reflectance of the beam splitter on a nearest side in a travel direction of the irradiating light being set lowest and the more toward a far side in the travel direction, the higher the reflectance of the beam splitters.

Preferably, the multifocal optical apparatus described above includes a laser line filter arranged between adjacent beam splitters, wherein the laser line filter is configured to transmit laser light which is the irradiating light.

The multifocal optical apparatus described above may further include a fiber bundle having a plurality of fibers on which signal light from the optical module is incident, wherein signal light collected by one of the second lenses may be incident on the plurality of fibers.

Preferably, in the multifocal optical apparatus described above, the plurality of fibers configured to propagate signal light collected by different second lenses are arranged at intervals.

The multifocal optical apparatus described above may include a spectroscope configured to disperse and detect signal light emitted from the fiber bundle, the spectroscope including an incidence slit, a spectroscopic unit configured to disperse the signal light having passed through the incidence slit, and a two-dimensional array photodetector configured to detect the signal light having been dispersed by the spectroscopic unit, wherein the fibers may be arranged along a longitudinal direction of the incidence slit at an exit end of the fiber bundle.

The multifocal optical apparatus described above may further include a two-dimensional array photodetector in which light-receiving elements configured to detect signal light collected by the second lenses are arranged.

In the multifocal optical apparatus described above, the light source may be provided in plurality, and the irradiating light from the plurality of light sources may be caused to be incident on an incidence opening of the optical module.

According to the present invention, an optical module which enables thinning and a multifocal optical apparatus can be provided.

DESCRIPTION OF EMBODIMENTS

Hereinafter, embodiments to which the present invention is applicable will be described. The following description is intended as a description of embodiments of the present invention and is not intended to limit the invention to the following embodiments. In the following description, omissions and abridgments have been made when appropriate for the sake of clarity. In addition, a person skilled in the art can readily modify, add, or transform each element in the following embodiments within the scope of the present invention. It is to be understood that elements assigned same reference signs in the respective drawings denote similar elements and descriptions thereof are to be omitted when appropriate.

First Embodiment

Figure 1:
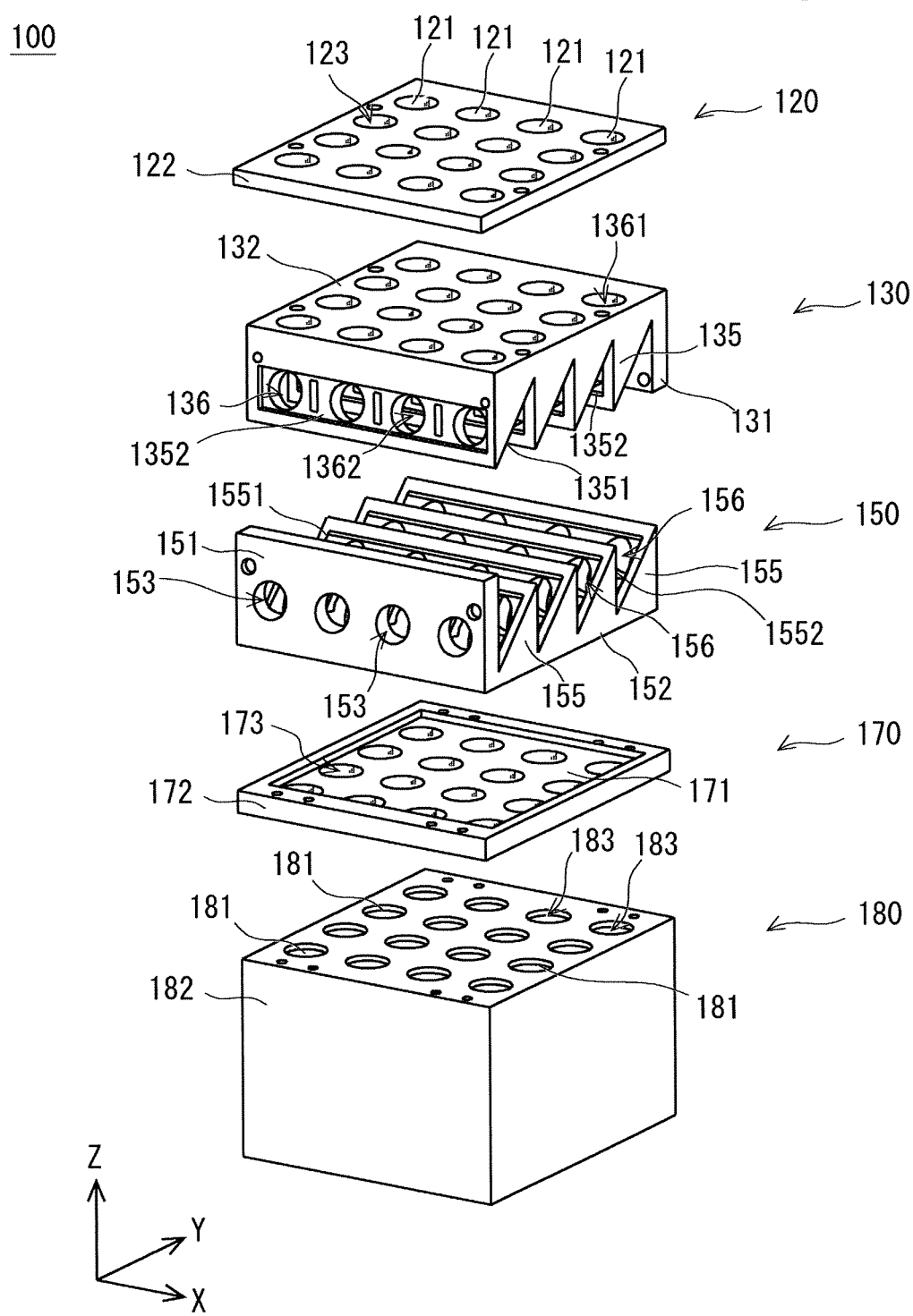
FIG. 1 is an exploded perspective view showing a configuration of an optical module according to a first embodiment.
Figure 2:
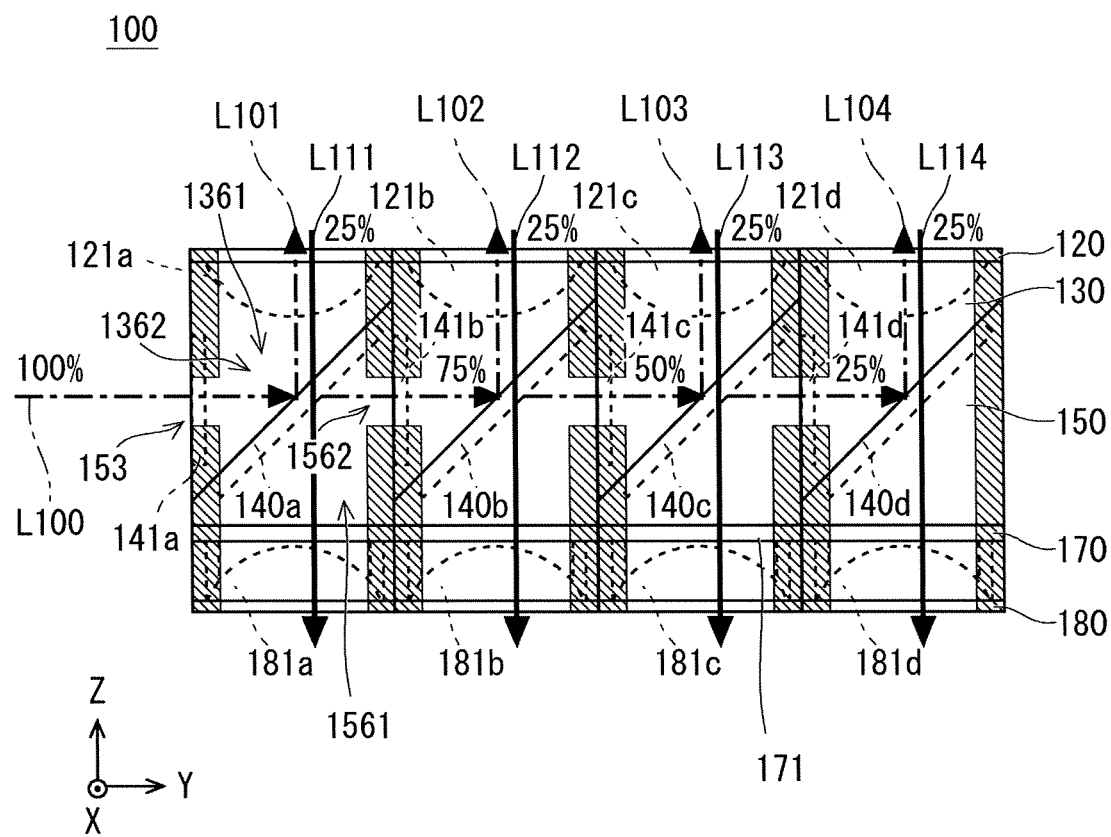
FIG. 2 is a sectional view schematically showing an optical system in an optical module.

An optical module 100 according to a first embodiment will be described with reference to FIG. 1 and FIG. 2. FIG. 1 is an exploded perspective view showing a configuration of a main portion of the optical module 100. FIG. 2 is a diagram for explaining an optical system in the optical module 100.

The optical module 100 according to the present embodiment functions as an optical system for performing multifocal observation by a lens array. The optical module 100 constitutes an optical system for guiding excitation light from a light source to a sample and for guiding signal light from the sample. Multiple spots in the sample can be observed at the same time. For example, the optical module 100 can be used in a Raman spectroscopic measurement apparatus, a dynamic light scattering (DLS) apparatus, a plasmon sensor, and the like.

As shown in FIG. 1, the optical module 100 is a module for forming 16 (=4×4) focal points. Note that the following description will be given using an XYZ three-dimensional orthogonal coordinate system. The X direction and the Y direction are directions in which focal points are arranged. In other words, in a sample, four focal points are arranged in the X direction and four focal points are arranged in the Y direction. Accordingly, 16 points of the sample can be spectroscopically measured at the same time. A Z direction is a direction parallel to an optical axis of a first lens 121 which is an objective lens.

Specifically, an XY plane constitutes a horizontal plane and a +Z direction constitutes a vertically upward direction. In other words, the optical module 100 is arranged on a lower side of the sample and configured to irradiate the sample with excitation light from below. In addition, as shown in FIG. 2, excitation light L100 which travels in a +Y direction is incident on the optical module 100. Preferably, the excitation light L100 constitutes a parallel beam. First, an optical system of the excitation light and signal light will be described with reference to FIG. 2.

The optical module 100 has dichroic mirrors 140a to 140d which are inclined by 45 degrees with respect to an optical axis of the excitation light L100. The dichroic mirrors 140a to 140d reflect the excitation light to the +Z direction and transmit the signal light traveling in a −Z direction. First lenses 121a to 121d (illustrated as first lenses 121 in FIG. 1) and second lenses 181a to 181d (illustrated as second lenses 181 in FIG. 1) are arranged on an optical path of the signal light from each focal point. For example, the first lenses 121 have a diameter of 4 mm and an NA of 0.51.

A laser line filter 141a to a laser line filter 141d and the dichroic mirrors 140a to 140d are arranged on the optical axis of the excitation light L100. The laser line filters 141a to 141d have wavelength characteristics of transmitting light with the wavelength of the excitation light and blocking light with wavelengths other than that of the excitation light. The laser line filters 141a to 141d are plate-shaped members and are each arranged along an XZ plane. When not differentiating the laser line filters 141a to 141d, a collective description of a laser line filter 141 will be used. The laser line filter 141 is a rectangular flat plate with the X direction as a longitudinal direction and the Z direction as a short-side direction.

The dichroic mirrors 140a to 140d have characteristics of reflecting at least a part of light with the wavelength of the excitation light and transmitting light with the wavelength of the signal light. The dichroic mirrors 140a to 140d have different reflectances with respect to the wavelength of the excitation light. The dichroic mirrors 140a to 140d are plate-shaped members. In a YZ plan view, the dichroic mirrors 140a to 140d are arranged so as to be inclined by 45 degrees with respect to the Y axis. When not differentiating the dichroic mirrors 140a to 140d, a collective description of a dichroic mirror 140 will be used. The dichroic mirrors 140a to 140d are rectangular flat plates with the X direction as a longitudinal direction and a direction of the 45-degree inclination as a short-side direction. The dichroic mirror 140 functions as a beam splitter which separates optical paths of the excitation light and the signal light.

The laser line filters 141a to 141d and the dichroic mirrors 140a to 140d are alternately arranged on the optical path of the excitation light L100. In other words, the laser line filter 141a, the dichroic mirror 140a, the laser line filter 141b, the dichroic mirror 140b, the laser line filter 141c, the dichroic mirror 140c, the laser line filter 141d, and the dichroic mirror 140d are arranged in this order from the −Y direction toward the +Y direction. Note that FIG. 2 shows a proportion (%) of an amount of light reflected or transmitted by the dichroic mirrors 140a to 140d with an amount of incident excitation light L100 being 100% (a similar description applies to FIG. 4, FIG. 11, FIG. 12, and the like presented below).

The first lenses 121a to 121d are respectively arranged on an upper side of the dichroic mirrors 140a to 140d. The second lenses 181a to 181d are respectively arranged on a lower side of the dichroic mirrors 140a to 140d. The first lens 121a and the second lens 181a are arranged as a pair on an optical path of the signal light.

First, the excitation light L100 enters the optical module 100 via an incidence opening 153. The excitation light L100 is then incident on the laser line filter 141a. The excitation light L100 transmitted through the laser line filter 141a is incident on the dichroic mirror 140a via an excitation light opening 1362. The dichroic mirror 140a reflects a part of the excitation light L100 but also transmits a part thereof. The excitation light reflected by the dichroic mirror 140a will be denoted as excitation light L101. Since the dichroic mirror 140a is inclined by 45 degrees, the excitation light L101 travels in the +Z direction. The excitation light L101 is incident on the first lens 121a via a signal light opening 1361. The excitation light L101 is focused onto a sample (not illustrated) by the first lens 121a. Raman scattering light is generated when the sample is irradiated with the excitation light L101. The Raman scattering light has a different wavelength from the excitation light L101. The Raman scattering light is generated in various directions. The Raman scattering light which travels in the −Z direction and is incident on the first lens 121a will be referred to as signal light L111.

The first lens 121a collects the signal light L111. The signal light L111 collected by the first lens 121a is incident on the dichroic mirror 140a via the signal light opening 1361. The signal light L111 is transmitted through the dichroic mirror 140a. The signal light L111 transmitted through the dichroic mirror 140a is incident on the second lens 181a via a signal light opening 1561. The second lens 181a focuses the signal light L111 onto an incidence end of a fiber (not illustrated). In addition, the signal light L111 is propagated through the fiber and guided to a spectroscope (not illustrated). Descriptions of the fiber and the spectroscope will be provided later.

The signal light opening 1561 and an excitation light opening 1562 are provided in a second holder unit 150 to be described later. The signal light opening 1361 and the excitation light opening 1362 are provided in a first holder unit 130 to be described later. Descriptions of the signal light opening 1361, the excitation light opening 1362, the signal light opening 1561, and the excitation light opening 1562 will be provided later.

In addition, the excitation light L100 transmitted through the dichroic mirror 140a is incident on the laser line filter 141b via the excitation light opening 1562. The excitation light L100 transmitted through the laser line filter 141b is incident on the dichroic mirror 140b. The dichroic mirror 140b reflects a part of the excitation light L100 but also transmits a part thereof. The excitation light reflected by the dichroic mirror 140b will be denoted as excitation light L102. Since the dichroic mirror 140b is inclined by 45 degrees, the excitation light L102 travels in the +Z direction. The excitation light L102 is focused onto a sample (not illustrated) by the first lens 121b. Raman scattering light is generated when the sample is irradiated with the excitation light L102. The Raman scattering light which travels in the −Z direction and is incident on the first lens 121b will be referred to as signal light L112.

The first lens 121b collects the signal light L112. The signal light L112 collected by the first lens 121b is transmitted through the dichroic mirror 140b. The signal light L112 transmitted through the dichroic mirror 140b is incident on the second lens 181b. The second lens 181b focuses the signal light L112 onto an incidence end of a fiber which is not illustrated. In addition, the signal light L112 is propagated through the fiber and guided to a spectroscope.

The excitation light L100 transmitted through the dichroic mirror 140b is incident on the laser line filter 141c. The excitation light L100 transmitted through the laser line filter 141c is incident on the dichroic mirror 140c. The dichroic mirror 140c reflects a part of the excitation light L100 but also transmits a part thereof. The excitation light reflected by the dichroic mirror 140c will be denoted as excitation light L103. Since the dichroic mirror 140c is inclined by degrees, the excitation light L103 travels in the +Z direction. The excitation light L103 is focused onto a sample (not illustrated) by the first lens 121c. Raman scattering light is generated when the sample is irradiated with the excitation light L103. The Raman scattering light which travels in the −Z direction and is incident on the first lens 121c will be referred to as signal light L113.

The first lens 121c collects the signal light L113. The signal light L113 collected by the first lens 121c is transmitted through the dichroic mirror 140c. The signal light L113 transmitted through the dichroic mirror 140c is incident on the second lens 181c. The second lens 181c focuses the signal light L113 onto an incidence end of a fiber which is not illustrated. In addition, the signal light L113 is propagated through the fiber and guided to a spectroscope.

The excitation light L100 transmitted through the dichroic mirror 140c is incident on the laser line filter 141d. The excitation light L100 transmitted through the laser line filter 141d is incident on the dichroic mirror 140d. The dichroic mirror 140d reflects all of the excitation light L100. The excitation light reflected by the dichroic mirror 140d will be denoted as excitation light L104. Since the dichroic mirror 140d is inclined by 45 degrees, the excitation light L104 travels in the +Z direction. The excitation light L104 is focused onto a sample (not illustrated) by the first lens 121d. Raman scattering light is generated when the sample is irradiated with the excitation light L104. The Raman scattering light which travels in the −Z direction and is incident on the first lens 121d will be referred to as signal light L114.

The first lens 121d collects the signal light L114. The signal light L114 collected by the first lens 121d is transmitted through the dichroic mirror 140d. The signal light L114 transmitted through the dichroic mirror 140d is incident on the second lens 181d. The second lens 181d focuses the signal light L114 onto an incidence end of a fiber which is not illustrated. In addition, the signal light L114 is propagated through the fiber and guided to a spectroscope.

In addition, a single edge filter 171 is arranged on a lower side of the dichroic mirrors 140a to 140d. The edge filter 171 is arranged on an upper side of the second lenses 181a to 181d. In other words, the edge filter 171 is arranged in optical paths of the beams of signal light L111 to L114 from the dichroic mirrors 140a to 140d to the second lenses 181a to 181d.

The edge filter 171 blocks light with the wavelength of the excitation light but transmits light with wavelengths longer than the wavelength of the excitation light. Accordingly, the edge filter 171 blocks the excitation light but transmits signal light. Since the excitation light can be prevented from being detected by a spectroscope, noise can be suppressed. Note that the single edge filter 171 is commonly arranged in the optical paths of the beams of the signal light L111 to L114. In other words, the edge filter 171 is not separated for each of the optical paths of the beams of signal light L111 to L114.

As described above, the excitation light L100 is incident on the laser line filter 141a, the dichroic mirror 140a, the laser line filter 141b, the dichroic mirror 140b, the laser line filter 141c, the dichroic mirror 140c, the laser line filter 141d, and the dichroic mirror 140d in this order. In addition, the dichroic mirrors 140a to 140d reflect the excitation light L100. In this case, reflectances of the dichroic mirrors 140a to 140d with respect to the excitation light L100 increase in an order of incidence of the excitation light L100. Adopting such a setting enables excitation light intensity at the respective focal points to be made uniform. Hereinafter, this point will be described in detail.

Figure 3:
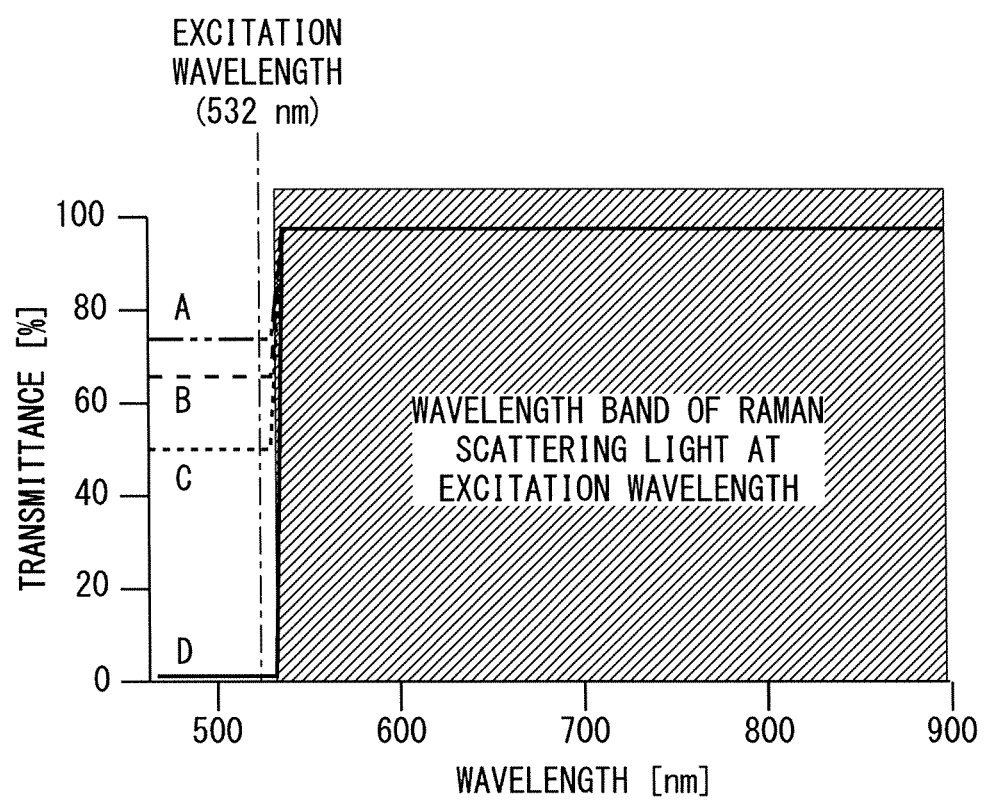
FIG. 3 is a graph showing wavelength characteristics of dichroic mirrors.

FIG. 3 is a graph showing wavelength characteristics of the dichroic mirrors 140a to 140d. In the following description, an excitation wavelength of the excitation light L100 is assumed to be 532 nm. Graphs of wavelength characteristics of transmittance of the dichroic mirrors 140a to 140d are denoted by A to D, respectively. In the following description, the transmittance of the excitation light L100 in the laser line filters 141a to 141d is assumed to be 100%. In addition, it is assumed that a sum of transmittance and reflectance in each of the dichroic mirrors 140a to 140d is 100%. Hereinafter, an amount of the excitation light will be described on the assumption that an amount of the excitation light L100 incident on the optical module 100 is 100%.

The transmittance of the dichroic mirror 140a is 75% (graph A in FIG. 3). The reflectance of the dichroic mirror 140a is 25%. The amount of the excitation light L101 reflected by the dichroic mirror 140a and incident on the first lens 121a is 25% (=1×0.25). The amount of the excitation light L100 transmitted through the dichroic mirror 140a and incident on the dichroic mirror 140b is 75% (=1×0.75).

The transmittance of the dichroic mirror 140b is 66.7% (graph B in FIG. 3). The reflectance of the dichroic mirror 140b is 33.3%. Therefore, the amount of the excitation light L102 reflected by the dichroic mirror 140b and incident on the first lens 121b is 25% (=0.75×0.333). The amount of the excitation light L100 transmitted through the dichroic mirror 140b and incident on the dichroic mirror 140c is 50% (=0.75×0.667).

The transmittance of the dichroic mirror 140c is 50% (graph C in FIG. 3). The reflectance of the dichroic mirror 140c is 50%. Therefore, the amount of the excitation light L103 reflected by the dichroic mirror 140c and incident on the first lens 121c is 25% (=0.5×0.5). The amount of the excitation light L100 transmitted through the dichroic mirror 140c and incident on the dichroic mirror 140d is 25% (=0.5×0.5).

The transmittance of the dichroic mirror 140d is 0% (graph D in FIG. 3). The reflectance of the dichroic mirror 140d is 100%. Therefore, the amount of the excitation light L104 reflected by the dichroic mirror 140d and incident on the first lens 121d is 25% (=0.25×1).

Figure 4:
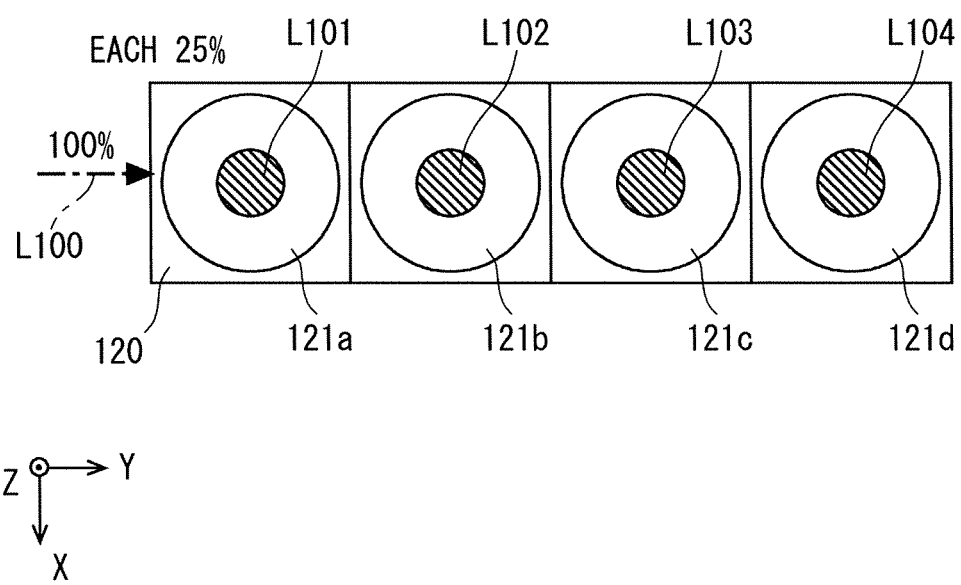
FIG. 4 is a top view showing a configuration of an optical module.

Therefore, as shown in FIG. 4, the amounts of the beams of the excitation light L101 to L104 respectively collected by the first lenses 121a to 121d are respectively 25%. Note that FIG. 4 is a top view showing a part of the configuration of the optical module 100. Excitation light power at the plurality of focal points can be made uniform. Therefore, Raman spectra at the respective focal points can be appropriately compared with each other. Note that while only four focal points are shown in FIG. 4, 16 focal points are actually formed.

As described above, the excitation light L100 is branched four ways as the excitation light L100 is sequentially incident on the three dichroic mirrors 140a to 140c. In addition, the beams of the excitation light L101 to L104 reflected by the dichroic mirrors 140a to 140d respectively form a focal point on a sample. Furthermore, the more toward a far side from a near side of the excitation light L100 traveling in the +Y direction, the lower the transmittances of the plurality of dichroic mirrors 140a to 140d. The more toward the far side from the near side of the excitation light L100 traveling in the +Y direction, the higher the reflectances of the plurality of dichroic mirrors 140a to 140d. In the travel direction of the excitation light L100, the reflectance of the dichroic mirror 140a on the nearest side (−Y side) is lowest and the reflectances of the dichroic mirrors 140 become higher more toward the far side (+Y side). Adopting such a configuration enables variability of excitation light power to be suppressed even when multiple focal points are excited at the same time.

Note that, in reality, the transmittances of the laser line filters 141a to 141d do not completely become 100%. In addition, the sums of the transmittance and the reflectance of the dichroic mirrors also do not completely become 100%. Therefore, wavelength characteristics of the dichroic mirrors 140a to 140d may be determined in consideration of the reflectance, the transmittance, and the like of each optical component. For example, appropriate wavelength characteristics can be obtained by adjusting a film thickness of a reflective film to be formed on the dichroic mirrors 140a to 140d.

The first lenses 121a to 121d are provided on a first lens array unit 120. The second lenses 181a to 181d are provided on a second lens array unit 180. The dichroic mirrors 140a to 140d and the laser line filters 141a to 141d are held by the first holder unit 130 and the second holder unit 150. In other words, the dichroic mirrors 140a to 140d and the laser line filters 141a to 141d are arranged between the first holder unit 130 and the second holder unit 150.

A configuration for fixing optical components such as the dichroic mirrors 140a to 140d and the laser line filters 141a to 141d will be described with reference to FIG. 1. The optical module 100 includes the first lens array unit 120, the first holder unit 130, the second holder unit 150, an edge filter unit 170, and the second lens array unit 180. The first lens array unit 120, the first holder unit 130, the second holder unit 150, the edge filter unit 170, and the second lens array unit 180 are arranged in this order from top to bottom.

The first lens array unit 120 has the plurality of first lenses 121 and a holding plate 122. The holding plate 122 is a plate-shaped member along the XY plane. The holding plate 122 holds 16 first lenses 121. In the first lens array unit 120, four first lenses 121 are arranged in the X direction and four first lenses 121 are arranged in the Y direction. The plurality of first lenses 121 are arranged at regular intervals in the X direction and the Y direction.

For example, circular through holes 123 corresponding to the first lenses 121 are formed in the holding plate 122 and the first lenses 121 are arranged in the through holes 123. In other words, 16 through holes 123 are formed in an array shape in the holding plate 122 and each through hole 123 is formed along the Z direction.

Each of the first lenses 121 constitutes an objective lens. In other words, each of the first lenses 121 focuses the excitation light onto a sample and, receives the signal light from the sample. An optical axis of each of the first lenses 121 is parallel to the Z direction.

The plurality of first lenses 121 are at a same position in the Z direction. The sample is arranged above the first lens array unit 120. For example, a multiwell plate (not illustrated in FIG. 1) for holding the sample is arranged on top of the first lens array unit 120.

The second lens array unit 180 is arranged on a −Z side of the first lens array unit 120. The second lens array unit 180 has the plurality of second lenses 181 and a holding block 182. The holding block 182 is a rectangular parallelopiped-shaped member. The holding block 182 holds 16 second lenses 181. In the second lens array unit 180, four second lenses 181 are arranged in the X direction and four second lenses 181 are arranged in the Y direction. The plurality of second lenses 181 are arranged at regular intervals in the X direction and the Y direction.

For example, circular through holes 183 corresponding to the second lenses 181 are formed in the holding block 182 and the second lenses 181 are arranged in the through holes 183. 16 through holes 183 are formed in an array shape in the holding block 182 and each through hole 183 is formed along the Z direction.

In an XY plan view, each of the second lenses 181 is arranged so as to overlap with each of the first lenses 121. In other words, in an XY plan view, the second lenses 181 are arranged at same positions as the first lenses 121. The second lenses 181 are coaxially arranged with corresponding first lenses 121. Therefore, signal light collected by the first lenses 121 is incident on the second lenses 181.

The second lenses 181 are arranged on a +Z-side end of the holding block 182. In addition, an optical fiber (not illustrated) is arranged on a −Z-side of the holding block 182. The second lenses 181 focus signal light onto an incidence end of the optical fiber. Accordingly, the signal light passes the inside of the optical fiber and is guided to a spectroscope.

The first holder unit 130, the second holder unit 150, and the edge filter unit 170 are arranged between the second lens array unit 180 and the first lens array unit 120.

The edge filter unit 170 includes the edge filter 171 and a holding plate 172. The holding plate 172 is a plate-shaped member along the XY plane. The holding plate 172 holds the edge filter 171. The single edge filter 171 is arranged on top of the holding plate 172. For example, the edge filter 171 is arranged on a recess provided on the holding plate 172. The edge filter 171 is arranged along the XY plane.

Through holes 173 for signal light to pass through are formed in the holding plate 172. In other words, 16 through holes 173 are formed in the holding plate 172 and each through hole 173 is formed along the Z direction. The through holes 173 are arranged between the first lenses 121 and the second lenses 181. The signal light transmitted through the dichroic mirrors 140 passes through the through holes 173 and is incident on the second lenses 181.

The first holder unit 130 and the second holder unit 150 are arranged between the edge filter unit 170 and the first lens array unit 120. The first holder unit 130 is arranged between the second holder unit 150 and the first lens array unit 120.

Figure 5:
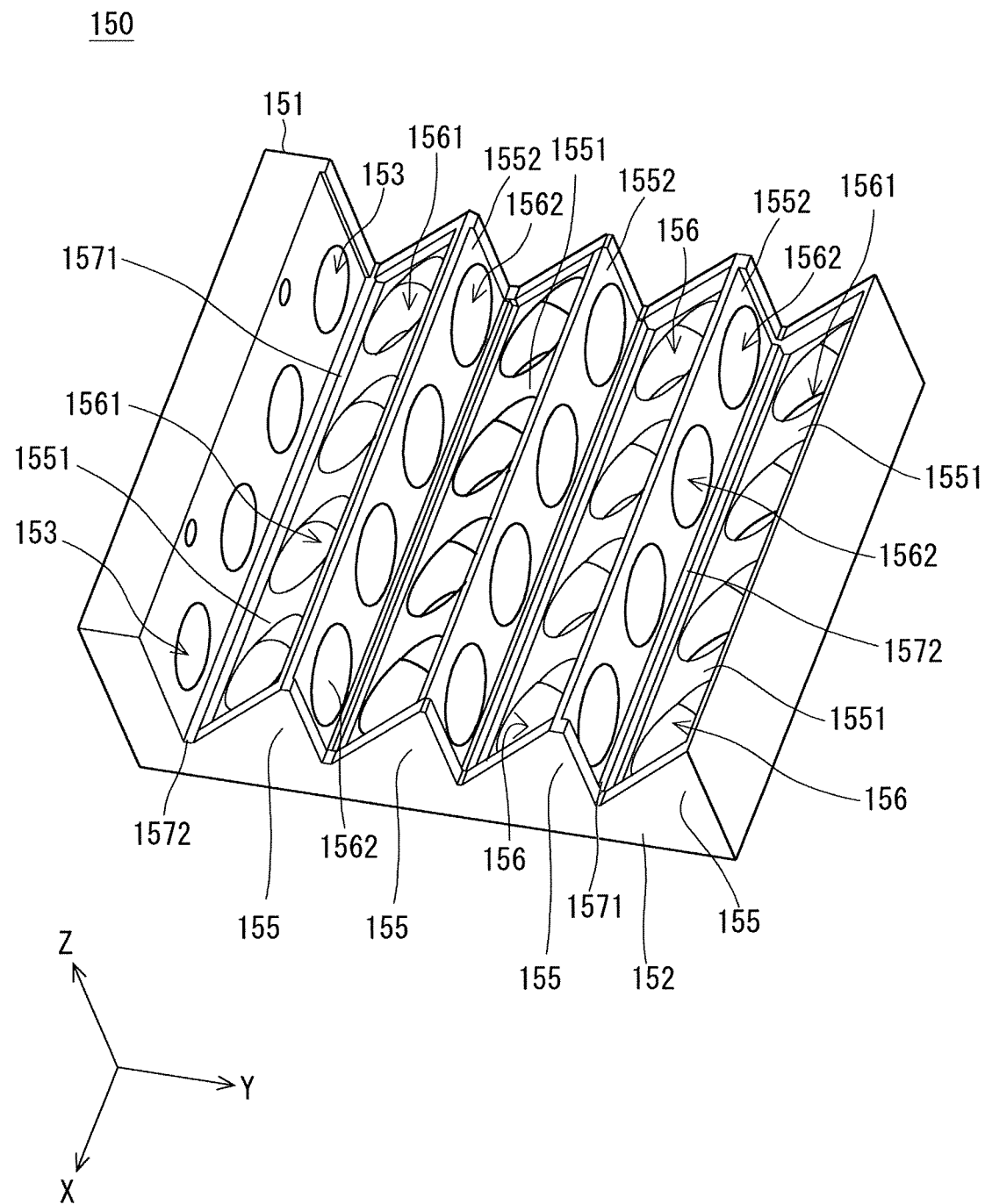
FIG. 5 is a perspective view showing a configuration of a second holder unit.

A detailed configuration of the second holder unit 150 will be described with reference to FIG. 5 together with FIG. 1 and the like. FIG. 5 is a perspective view showing a configuration of the second holder unit 150. The second holder unit 150 includes a side wall 151, a base portion 152, and inclined portions 155.

The base portion 152 is a plate-shaped portion which is parallel to the XY plane. The side wall 151 and the inclined portions 155 extend toward the +Z side from the base portion 152. The second holder unit 150 has four inclined portions 155.

The side wall 151 is provided on a side on which the excitation light L100 is incident (refer to FIG. 2). The side wall 151 is a plate-shaped portion which is formed parallel to the XZ plane and is arranged on a −Y-side end portion of the second holder unit 150. In this case, since four focal points are arranged in the X direction, four incidence openings 153 are formed on the side wall 151 (note that in FIG. 5, only three are shown due to a direction of perspective). The excitation light L100 passes through the incidence openings 153 and enters the optical module 100.

The laser line filter 141a shown in FIG. 2 (not illustrated in FIG. 5) is arranged on a +Y-side surface of the side wall 151. The four incidence openings 153 are covered by a single laser line filter 141*a*. The excitation light L100 passes through the incidence openings 153 and is incident on the laser line filter 141*a*. The excitation light L100 having been transmitted through one incidence opening 153 branches into four beams of excitation light L101 to L104 as shown in FIG. 2.

Since four focal points are arranged in the Y direction, the second holder unit 150 is provided with four inclined portions 155. The four inclined portions 155 are arranged in a row in the Y direction. Each inclined portion 155 is a triangular prism-shaped portion which extends along the X direction. The inclined portions 155 have a shape of an approximately orthogonal triangle in a YZ plan view. A −Y-side surface of the inclined portions 155 is an inclined surface 1551, and a +Y-side surface is a holding surface 1552.

The holding surface 1552 is a plane which is orthogonal to the Y axis so as to hold the laser line filters 141. The inclined surface 1551 is a plane which is inclined by 45 degrees with respect to the Y axis so as to hold the dichroic mirrors 140. The inclined surface 1551 and the holding surface 1552 are different surfaces of the inclined portions 155.

Since four focal points are arranged in the X direction, one inclined portion 155 is provided with four opening portions 156. The four opening portions 156 are arranged in a row in the X direction. In addition, the second holder unit 150 has four inclined portions 155. Therefore, the second holder unit 150 has 16 opening portions 156. In an XY plan view, the opening portions 156 are arranged in a 4×4 array shape. The same number of opening portions 156 as the number of focal points are formed in the second holder unit 150. The opening portions 156 have a signal light opening 1561 and an excitation light opening 1562.

The signal light opening 1561 is a columnar through hole which extends in the Z direction from the inclined surface 1551. The signal light opening 1561 penetrates the inclined portions 155 and the base portion 152 in the Z direction. A +Z-side end portion of the signal light opening 1561 is covered by the dichroic mirrors 140 (refer to FIG. 2). After being transmitted through the dichroic mirrors 140, signal light is incident on the signal light opening 1561. The signal light transmitted through the signal light opening 1561 is incident on the second lenses 181. The signal light from one focal point is transmitted through one signal light opening 1561.

The excitation light opening 1562 is a columnar through hole which extends in the Y direction from the inclined surface 1551. The excitation light opening 1562 penetrates the inclined portions 155 in the Y direction. In other words, the excitation light opening 1562 reaches the holding surface 1552 from the inclined surface 1551. A +Y-side end portion of the excitation light opening 1562 is covered by the laser line filters 141 (refer to FIG. 2). The excitation light L100 having been transmitted through the dichroic mirrors 140 is incident on the excitation light opening 1562. The excitation light L100 having been transmitted through the excitation light opening 1562 is transmitted through the laser line filters 141. The excitation light opening 1562 is arranged between two adjacent laser line filters 141.

Note that all of the beams of excitation light L101 are reflected by the dichroic mirror 140*d* in the inclined portion 155 which is farthest on the +Y side. Therefore, the inclined portion 155 which is farthest on the +Y side is not provided with the excitation light opening 1562 nor are there the laser line filters 141 arranged therein. In other words, the opening portions 156 of the inclined portion 155 which is farthest on the +Y side only have the signal light opening 1561 which extends in the Z direction.

As described above, the opening portions 156 have the signal light opening 1561 which extends in the Z direction and the excitation light opening 1562 which extends in the Y direction. In other words, the inclined portions 155 are provided with through holes respectively along the Y direction and the Z direction.

For example, in the configuration shown in FIG. 2, the excitation light L100 having been transmitted through one incidence opening 153 is branched into four beams by the dichroic mirrors 140*a* to 140*c*. In addition, the excitation light L100 is reflected by the dichroic mirrors 140*a* to 140*d* and becomes the beams of excitation light L101 to L104. Furthermore, the excitation light L100 is incident on the dichroic mirror 140*d* after passing through one incidence opening 153 and three excitation light openings 1562.

Next, the first holder unit 130 will be described with reference to FIG. 1. The first holder unit 130 includes a side wall 131, a base portion 132, and inclined portions 135. The first holder unit 130 has a similar configuration to that of the second holder unit 150. Therefore, descriptions of contents overlapping with those of the second holder unit 150 will be omitted when appropriate. For example, the side wall 131, the base portion 132, and the inclined portions 135 respectively correspond to the side wall 151, the base portion 152, and the inclined portions 155.

Specifically, the first holder unit 130 has a shape created by rotating the second holder unit 150 around the X axis by 180 degrees. Therefore, four inclined portions 135 are arranged on the −Y side of the side wall 131. Since the excitation light is not incident on the side wall 131, an incidence opening is not formed on the side wall 131.

The first holder unit 130 has four inclined portions 135. One inclined portion 135 has four opening portions 136. The first holder unit 130 includes 16 opening portions 136. In an XY plan view, the opening portions 136 are arranged in a 4×4 array shape. The same number of opening portions 136 as the number of focal points are provided in the first holder unit 130. The opening portions 136 include a signal light opening 1361 and an excitation light opening 1362.

The inclined portions 135 have an inclined surface 1351 and a holding surface 1352. The inclined surface 1351 is a plane which is inclined with respect to the Y axis. The inclined surface 1351 is a plane which is parallel to the dichroic mirrors 140. The holding surface 1352 is a plane which is orthogonal to the Y axis. The holding surface 1352 is a plane which is parallel to the laser line filters 141. The +Y-side surface of the inclined portions 135 constitutes the inclined surface 1351 and the −Y-side surface of the inclined portions 135 constitutes the holding surface 1352. The inclined surface 1351 and the holding surface 1352 are different surfaces.

The signal light opening 1361 is a columnar-shaped through hole which penetrates the inclined portions 135 in the Z direction. The signal light opening 1361 penetrates the inclined portions 135 and the base portion 132 in the Z direction. The signal light opening 1361 is provided between the dichroic mirrors 140 and the first lenses 121. Excitation light reflected by the dichroic mirrors 140 is transmitted through the signal light opening 1361 and incident on the first lenses 121. Signal light from the first lenses 121 is transmitted through the signal light opening 1361 and incident on the dichroic mirrors 140.

The excitation light opening 1362 is a columnar through hole which penetrates the inclined portions 135 in the Y direction. In other words, the excitation light opening 1362 reaches the holding surface 1352 from the inclined surface 1351. The excitation light L100 from the laser line filters 141 is transmitted through the excitation light opening 1362 and incident on the dichroic mirrors 140.

As described above, the opening portions 136 have the signal light opening 1361 which extends in the Z direction and the excitation light opening 1362 which extends in the Y direction. In other words, the inclined portions 155 are provided with through holes respectively along the Y direction and the Z direction.

In addition, the first holder unit 130 and the second holder unit 150 are combined with each other. The inclined surface 1351 of the inclined portions 135 and the inclined surface 1551 of the inclined portions 155 are arranged so as to oppose each other. The dichroic mirrors 140 are held between the inclined surface 1351 and the inclined surface 1551. In this case, since there are four inclined portions 135 and four inclined portions 155, four dichroic mirrors 140a to 140d can be held. As described above, by providing the inclined surface 1351 and the inclined surface 1551 which are inclined with respect to the Y axis, the dichroic mirrors 140 are sandwiched between the inclined portions 135 and the inclined portions 155.

The holding surface 1352 of the inclined portions 135 and the holding surface 1552 of the inclined portions 155 are arranged so as to oppose each other. The laser line filters 141 are held between the holding surface 1352 and the holding surface 1552. In addition, the laser line filters 141 are also held between the side wall 151 and the holding surface 1352. In this case, since the first holder unit 130 has four inclined portions 135 and the second holder unit 150 has one side wall 151 and three inclined portions 155, four laser line filters 141a to 141d can be held. As described above, by providing the holding surface 1352 and the holding surface 1552 which are orthogonal to the Y axis, the laser line filters 141 are sandwiched between the inclined portions 135 and the inclined portions 155.

Note that the inclined portions 135 and the inclined portions 155 may be provided with recesses for arranging the laser line filters 141 and the dichroic mirrors 140. For example, as shown in FIG. 5, a filter holding portion 1571 and a mirror holding portion 1572 are provided in a vicinity of a lower end of the inclined portions 155. Specifically, the filter holding portion 1571 and the mirror holding portion 1572 are formed in a portion where the inclined surface 1551 and the holding surface 1552 intersect each other on a lower side of the opening portions 156.

The filter holding portion 1571 is to be a surface for holding the laser line filters 141. In other words, an end surface on a lower side of the laser line filters 141 abuts on the filter holding portion 1571. The mirror holding portion 1572 is to be a surface for holding the dichroic mirrors 140. In other words, an end surface on a lower side of the dichroic mirrors 140 abuts on the mirror holding portion 1572. The filter holding portion 1571 and the mirror holding portion 1572 form a step. Specifically, the mirror holding portion 1572 is lower than the filter holding portion 1571. The first holder unit 130 and the second holder unit 150 are capable of appropriately holding the laser line filters 141 and the dichroic mirrors 140.

Figure 6:
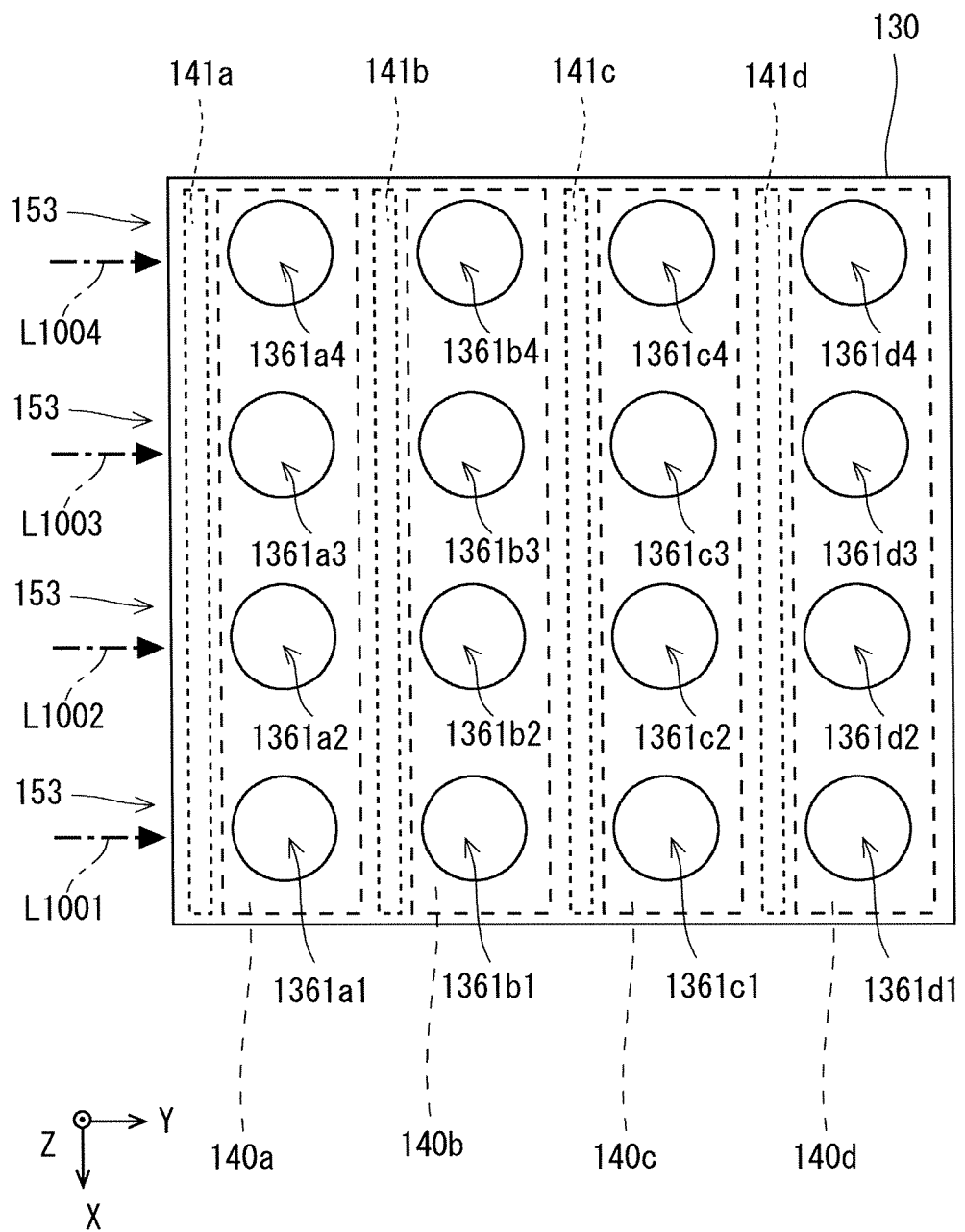
FIG. 6 is a top view schematically showing a configuration of dichroic mirrors and laser line filters held by first and second holder units.

The dichroic mirrors 140 and the laser line filters 141 which are held by the first holder unit 130 and the second holder unit 150 will be described with reference to FIG. 6. FIG. 6 is a top view schematically showing a state where the first holder unit 130 and the second holder unit 150 are holding the dichroic mirrors 140 and the laser line filters 141.

In FIG. 6, 16 signal light openings 1361 are differentiated as signal light openings 1361a1 to 1361a4, signal light openings 1361b1 to 1361b4, signal light openings 1361c1 to 1361c4, and signal light openings 1361d1 to 1361d4. The signal light openings 1361a1 to 1361a4 are four signal light openings 1361 which are lined up in the X direction and are arranged in a first column on a −Y side. In an XY plan view, the signal light openings 1361a1 to 1361a4 overlap with the dichroic mirror 140a. In a similar manner, the signal light openings 1361b1 to 1361b4 are four signal light openings 1361 which are lined up in the X direction and are arranged in a second column from the −Y side. In an XY plan view, the signal light openings 1361b1 to 1361b4 overlap with the dichroic mirror 140b.

The signal light openings 1361c1 to 1361c4 are four signal light openings 1361 which are lined up in the X direction and are arranged in a third column from the −Y side. In an XY plan view, the signal light openings 1361c1 to 1361c4 overlap with the dichroic mirror 140c. The signal light openings 1361d1 to 1361d4 are four signal light openings 1361 which are lined up in the X direction and are arranged in a fourth column from the −Y side. In an XY plan view, the signal light openings 1361d1 to 1361d4 overlap with the dichroic mirror 140d. In addition, the signal light openings 1361a1, 1361b1, 1361c1, and 1361d1 are four signal light openings 1361 which are lined up in the Y direction.

In FIG. 6, the beams of excitation light transmitted through the four incidence openings 153 provided in the second holder unit 150 are denoted as beams of excitation light L1001 to L1004. In addition, as shown in FIG. 2, four dichroic mirrors 140a to 140d and four laser line filters 141a to 141d are provided.

The excitation light L1001 is incident on the laser line filter 141a, the dichroic mirror 140a, the laser line filter 141b, the dichroic mirror 140b, the laser line filter 141c, the dichroic mirror 140c, the laser line filter 141d, and the dichroic mirror 140d in this order. In addition, as shown in FIG. 2, the excitation light L1001 is branched four ways and respectively transmitted through the signal light openings 1361a1, 1361b1, 1361c1, and 1361d1.

For example, the excitation light L1001 reflected by the dichroic mirror 140a is transmitted through the signal light opening 1361a1 and the excitation light L1001 reflected by the dichroic mirror 140b is transmitted through the signal light opening 1361b1. The excitation light L1001 reflected by the dichroic mirror 140c is transmitted through the signal light opening 1361c1 and the excitation light L1001 reflected by the dichroic mirror 140d is transmitted through the signal light opening 1361d1.

In a similar manner, the beams of excitation light L1002, L1003, and L1004 are also incident on the laser line filter 141a, the dichroic mirror 140a, the laser line filter 141b, the dichroic mirror 140b, the laser line filter 141c, the dichroic mirror 140c, the laser line filter 141d, and the dichroic mirror 140d in this order. Accordingly, each beam of excitation light is branched four ways and is transmitted through a corresponding signal light opening 1361.

In this manner, four beams of excitation light L1001 to L1004 are incident on one laser line filter 141. In addition, one dichroic mirror 140 reflects the four beams of excitation light L1001 to L1004. Adopting such a configuration enables multiple focal points arranged in an array shape to be formed.

Furthermore, since the plurality of dichroic mirrors 140 are being held, an apparatus configuration can be downsized. For example, in the configuration according to Patent Literature 1, multiple focal points in an array shape are formed due to the excitation light being reflected by one dichroic mirror. There is a problem that a size of the dichroic mirror cannot be reduced. In contrast, excitation light reflected by one dichroic mirror 140 forms multiple focal points of one column. In addition, a plurality of the dichroic mirrors 140 are combined to form multiple focal points in an array shape. In other words, multiple focal points in an array shape are formed due to excitation light sequentially passing through the plurality of dichroic mirrors 140a to 140c.

In an XY plan view, the dichroic mirror 140a overlaps with the first lenses 121a which are arranged in one column along the X direction. According to this configuration, a size of the optical module can be reduced. Specifically, a size of an optical system in the Z direction can be reduced. In particular, area enlargement and thinning can be realized. Furthermore, using a plurality of dichroic mirrors with different reflectances and transmittances enables excitation light power of the multiple focal points to be made uniform.

In addition, the laser line filter 141 is held between the holding surface 1352 which is a different surface from the inclined surface 1351 and the holding surface 1552 which is a different surface from the inclined surface 1551. Therefore, the laser line filter 141 is arranged between two dichroic mirrors 140. Accordingly, crosstalk can be suppressed. In other words, the signal light generated at one focal point can be prevented from being mixed with the signal light generated at another focal point.

The number of focal points can be increased by using the optical module 100 described above in plurality. For example, the number of focal points can be increased by arranging the plurality of optical modules 100 in an array shape. When arranging two optical modules 100 by lining up the optical modules 100 in the Y direction, an arrangement direction of the optical modules 100 may be changed.

In FIG. 6, the beams of excitation light L1001 to L1004 may be generated by different light sources. In other words, two or more light sources may be prepared and each light source may be arranged in each incidence opening 153. Specifically, a small semiconductor laser light source can be used as the light source. Accordingly, downsizing of the apparatus and cost saving can be achieved. In addition, options in terms of an excitation wavelength can be increased. Alternatively, light from the light source may be relayed by an optical fiber or the like to be incident on the incidence openings 153. It is needless to say that light from one light source may be branched by an optical fiber or a mirror to be incident on two or more incidence openings 153.

Figure 7:
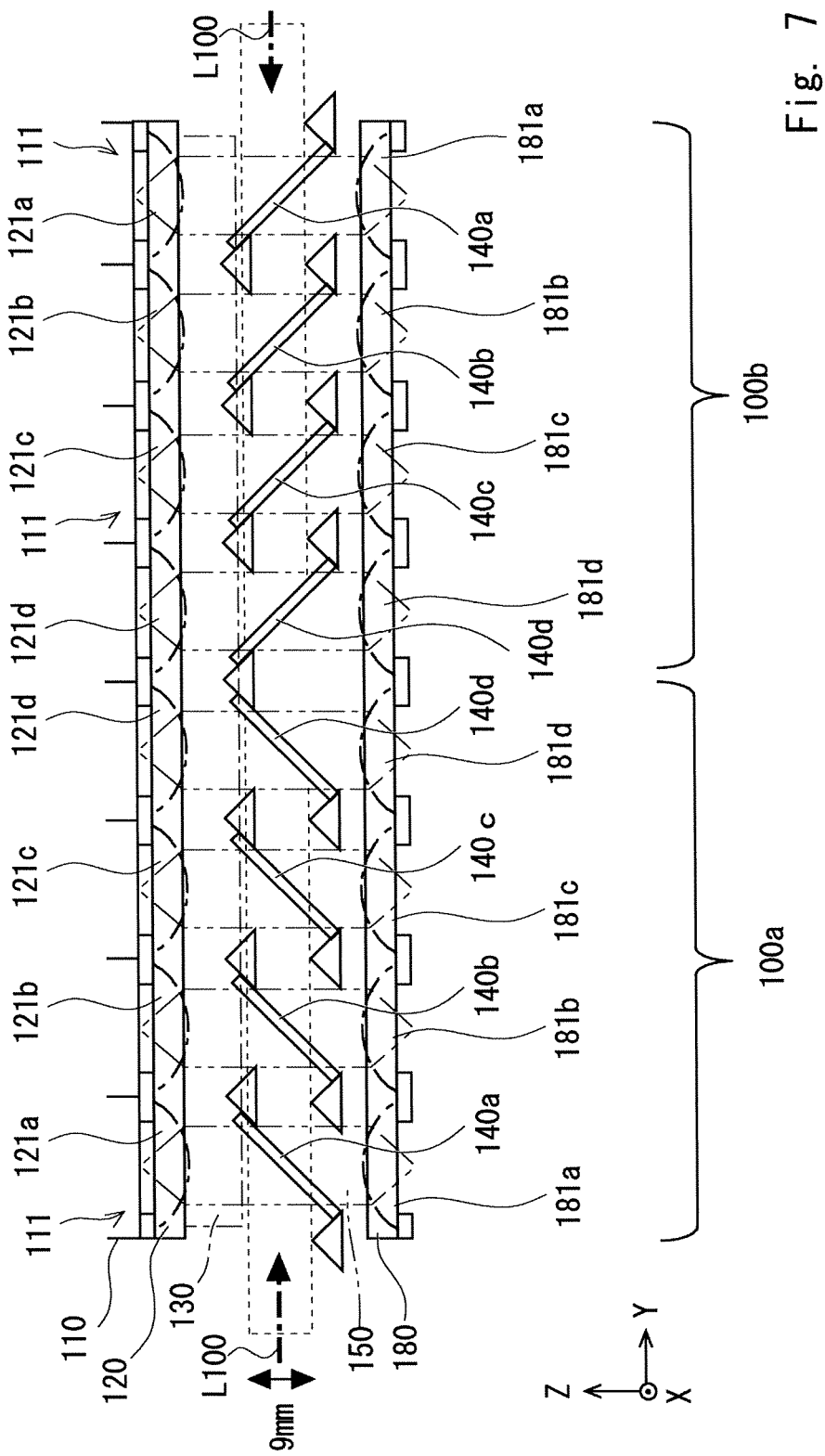
FIG. 7 is a side sectional view showing, in a simplified manner, an arrangement of dichroic mirrors in two optical modules.

FIG. 7 is a sectional view schematically showing a configuration in which two optical modules 100a and 100b are arranged. The optical module 100a and the optical module 100b are arranged so as to be lined up in the Y direction. Note that the laser line filters 141 and the edge filter 171 have been omitted in FIG. 7.

The optical module 100a and the optical module 100b respectively have the same configuration as the optical module 100 described above and are arranged so as to be mutually inverted. The optical module 100a is arranged in a same orientation as the optical module 100 shown in FIG. 2 and FIG. 3. The optical module 100b is arranged in an orientation where the optical module 100a has been rotated by 180 degrees around the Z axis.

Therefore, incidence directions of the excitation light L100 are opposite in the optical module 100a and the optical module 100b. The excitation light L100 traveling in the +Y direction is incident on the optical module 100a. The excitation light L100 traveling in the −Y direction is incident on the optical module 100b. The dichroic mirrors 140a to 140d are provided in an order of incidence of excitation light in a similar manner to FIG. 2.

Therefore, installation angles differ by 90 degrees between the dichroic mirrors 140a to 140d of the optical module 100a and the dichroic mirrors 140a to 140d of the optical module 100b. In addition, the dichroic mirror 140d of the optical module 100a and the dichroic mirror 140d of the optical module 100b are arranged so as to be adjacent to each other.

In this case, an effective size of the dichroic mirrors 140 in the Z direction is approximately 9 mm. In addition, a size of the dichroic mirrors 140 in a short-side direction is approximately 12.7 mm. When forming four focal points lined up in the Y direction with one dichroic mirror as in Patent Literature 1, the size of the dichroic mirror is around 50 mm. The present embodiment enables thinning to be achieved.

Furthermore, a multiwell plate 110 is provided above the first lens array unit 120. The multiwell plate 110 includes a plurality of wells 111 arranged in an array shape. A sample to be an observation object is arranged in each well 111. A lens pair made up of the first lens 121 and the second lens 181 correspond to each well 111. The one first lens 121 focuses the excitation light onto the sample in one well 111. In addition, the signal light from the sample in the one well 111 is collected by the one second lens 181. In this manner, eight focal points arranged in the Y direction can be observed. The samples in the plurality of wells 111 can be observed at the same time.

(Multifocal Optical Apparatus)

Figure 8:
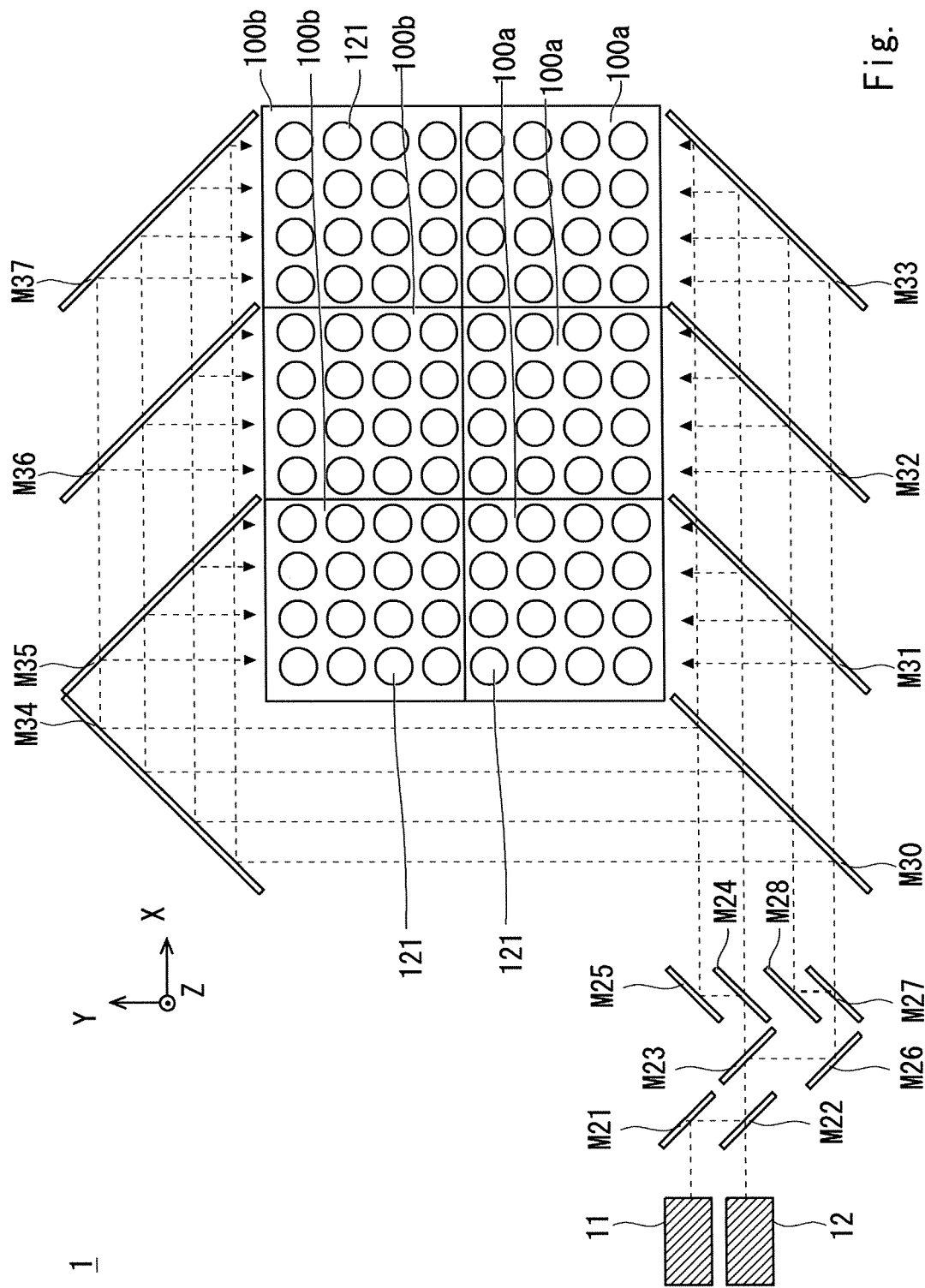
FIG. 8 is a schematic view showing a configuration of a multifocal optical apparatus including optical modules.

Hereinafter, a configuration of a multifocal optical apparatus mounted with a plurality of optical modules 100 will be described with reference to FIG. 8. FIG. 8 is a top view showing a configuration of a multifocal optical apparatus 1. In FIG. 8, three optical modules 100a and three optical modules 100b are provided. The three optical modules 100a are arranged in a single column along the X direction. The three optical modules 100b are arranged in a single column along the X direction. The optical modules 100a are arranged in the +Y side of the optical modules 100b.

The excitation light (also referred to as laser light) traveling in the +Y direction is incident on the optical modules 100a, and the excitation light (also referred to as laser light) traveling in the −Y direction is incident on the three optical modules 100b. By arranging the plurality of optical modules 100a and 100b in an array shape as described above, a larger number of focal points can be formed. For example, the multifocal optical apparatus observes 96 (=12×8) multiple focal points.

The multifocal optical apparatus 1 includes two light sources 11 and 12. The light source 11 generates laser light with a wavelength of 532 nm. The light source 12 generates laser light with a wavelength of 660 nm. Using the two light sources 11 and 12 by switching between the light sources 11 and 12 enables an excitation wavelength to be changed. The excitation wavelength is set to 532 nm by activating the light source 11 while deactivating the light source 12. The excitation wavelength is set to 660 nm by activating the light source 12 while deactivating the light source 11.

The multifocal optical apparatus 1 includes mirrors M21 to M28 and mirrors M31 to M37. Reflectances of the mirror M21, the mirror M25, the mirror M26, the mirror M28, the mirror M33, the mirror M34, and the mirror M37 are 100%. The mirror M23, the mirror M24, the mirror M27, the mirror M30, the mirror M32, and the mirror M36 are beam splitters with a reflectance of 50% and a transmittance of 50%. The mirror M31 and the mirror M33 are beam splitters with a reflectance of 33.3% and a transmittance of 66.7%. In addition, a beam splitter cube may be used as the beam splitters.

The mirror M22 is a switching mirror for switching excitation light. The mirror M22 is a dichroic mirror which transmits laser light with a wavelength of 532 nm and which reflects laser light with a wavelength of 660 nm. Alternatively, the mirror M22 may be a reflecting mirror arranged so as to be insertable to and extractable from an optical path. For example, when using laser light with a wavelength of 532 nm as the excitation light, the mirror M22 is extracted from the optical path. When using laser light with a wavelength of 660 nm as the excitation light, the mirror M22 is inserted into the optical path.

The laser light from the light source 11 is transmitted through the mirror M22 and is incident on the mirror M23. The laser light from the light source 12 is reflected by the mirror M22 and is incident on the mirror M23. The mirror M23 transmits half of the laser light and reflects the other half. One of the beams of laser light having been branched by the mirror M23 is incident on the mirror M24 and the other is incident on the mirror M26.

The mirror M23 reflects the laser light toward the mirror M24. The mirror M24 transmits half of the laser light and reflects the other half. The laser light transmitted through the mirror M24 is incident on the mirror M30. The laser light reflected by the mirror M24 is reflected by the mirror M25 and is incident on the mirror M30.

The mirror M26 reflects the laser light toward the mirror M27. The mirror M27 transmits half of the laser light and reflects the other half. The laser light transmitted through the mirror M27 is incident on the mirror M30. The laser light reflected by the mirror M27 is reflected by the mirror M28 and is incident on the mirror M30. By adopting such a configuration, four beams of laser light are incident on the mirror M30.

The mirror M30 transmits half of the laser light and reflects the other half. The mirror M30 branches the four beams of incident laser light into two beams of laser light. The four beams of laser light transmitted through the mirror M30 are incident on the mirror M31, the mirror M32, and the mirror M33 in this order. The mirrors M31 and M32 are beam splitters. The laser light reflected by the mirror M31 is incident on the first optical module 100a. The laser light reflected by the mirror M32 is incident on the second optical module 100a. The laser light reflected by the mirror M33 is incident on the third optical module 100a.

Four beams of laser light are incident on one optical module 100a. In this case, the reflectances of the mirror M31, the mirror M32, and the mirror M33 are 33%, 50%, and 100%. Therefore, amounts of light of the 12 beams of laser light which are incident on the three optical modules 100a can be made uniform.

The four beams of laser light reflected by the mirror M30 are incident on the mirror M34. The four beams of laser light reflected by the mirror M34 are incident on the mirror M35, the mirror M36, and the mirror M37 in this order. The mirrors M35 and M36 are beam splitters. The laser light reflected by the mirror M35 is incident on the first optical module 100b. The laser light reflected by the mirror M36 is incident on the second optical module 100b. The laser light reflected by the mirror M37 is incident on the third optical module 100b.

Four beams of laser light are incident on one optical module 100b. In this case, the reflectances of M35, M36, and M37 are 33%, 50%, and 100%. Therefore, amounts of light of the 12 beams of laser light which are incident on the three optical modules 100b can be made uniform. In addition, amounts of light of the beams of laser light which are incident on the optical modules 100a and the optical modules 100b can be made uniform.

Each of the 12 beams of laser light is branched four ways by the optical modules 100a. Each of the 12 beams of laser light is branched four ways by the optical modules 100b. Accordingly, 96 focal points can be observed at the same time. In addition, excitation light power at the respective focal points can be made uniform.

Figure 9:
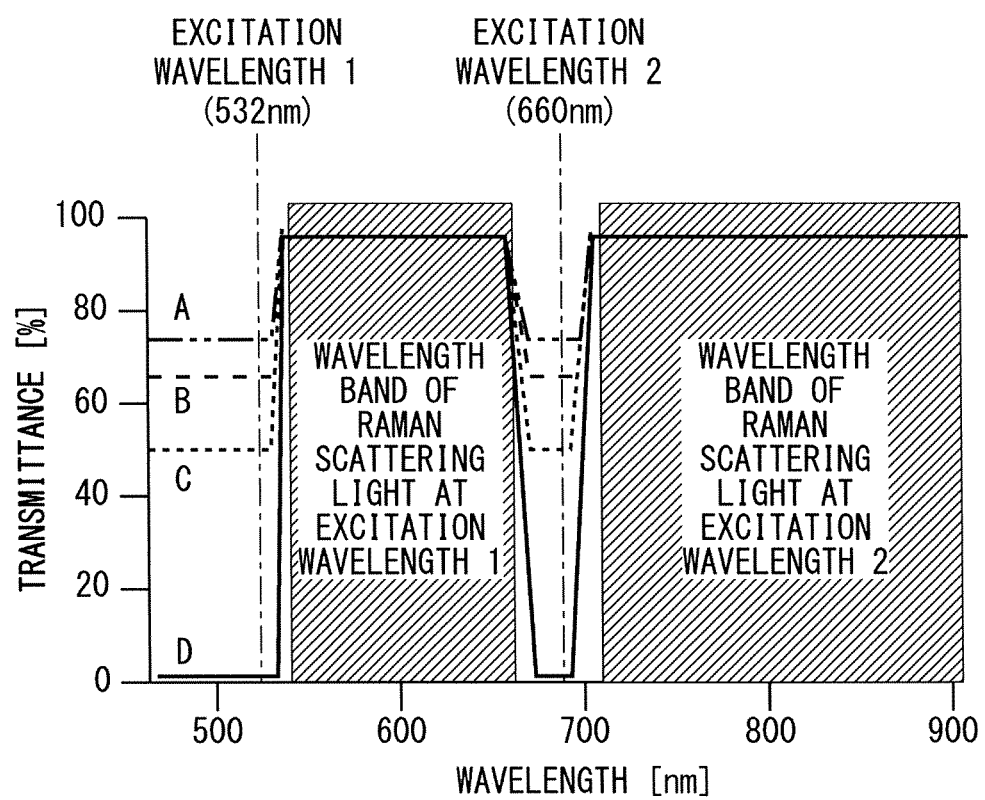
FIG. 9 is a graph showing wavelength characteristics of dichroic mirrors when switching between two wavelengths.

Wavelength characteristics of the dichroic mirrors 140 in the multifocal optical apparatus 1 which switches between two wavelengths are shown in FIG. 9. FIG. 9 shows graphs A to D of transmittances of the dichroic mirrors 140a to 140d. An excitation wavelength 1 is 532 nm and an excitation wavelength 2 is 660 nm. As shown in FIG. 9, transmittances at 532 nm and 660 nm are approximately 100%. In addition, transmittances are respectively 75%, 66.7%, 50%, and 0% in a wavelength band of Raman scattering at the excitation wavelength 1 and in a wavelength band of Raman scattering at the excitation wavelength 2. By adopting such wavelength characteristics, excitation light power can be made uniform at both excitation wavelengths. It is needless to say that switching may be performed among three or more excitation wavelengths.

Figure 10:
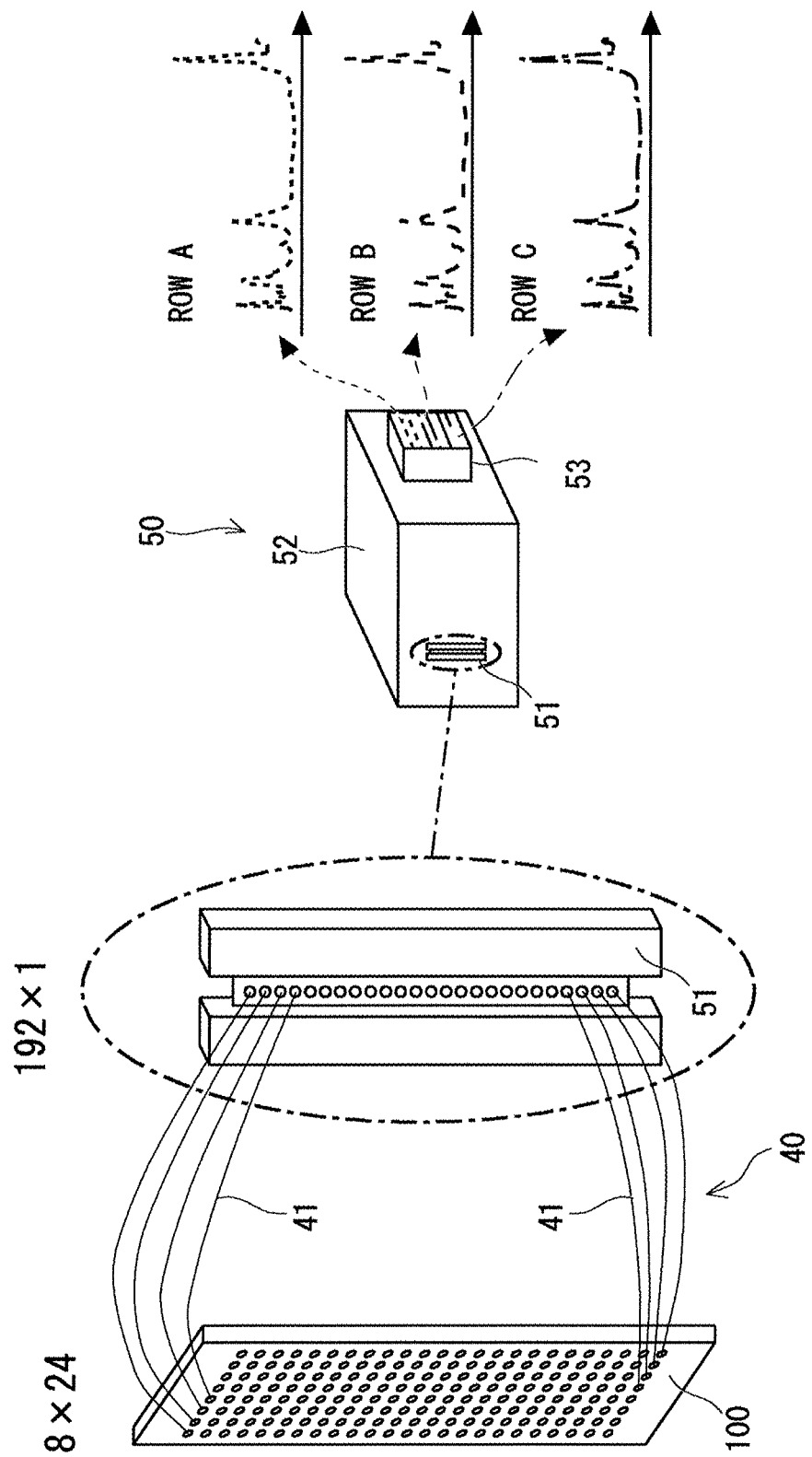
FIG. 10 is a diagram showing an optical system from an optical module to a spectroscope.

Next, an optical system from the optical module 100 to a spectroscope will be described with reference to FIG. 10. FIG. 10 is a schematic view for explaining an optical system from the optical module 100 to a spectroscope 50. The spectroscope 50 includes an incidence slit 51, a spectroscopic unit 52, and a two-dimensional array photodetector 53. A longitudinal direction of the incidence slit 51 is assumed to be a slit direction.

A fiber bundle 40 connects between the optical module 100 and the spectroscope 50. The fiber bundle 40 has a plurality of fibers 41. For example, an incidence end of each fiber 41 is arranged in the through hole 183 of the second lens array unit 180 in FIG. 1. Therefore, the signal light collected by the second lenses 181 is incident on the fibers 41. The fibers 41 are a multimode optical fiber.

In this case, since a configuration for forming 8×24 focal points is adopted, the fiber bundle 40 has 192 fibers 41. The incidence end of the fiber bundle 40 is arranged in an 8×24 array shape. The signal light from one focal point is incident on one fiber 41. The signal light propagates inside the fiber 41.

An exit end of the fiber bundle 40 is arranged in the incidence slit 51. The signal light having propagated inside the fiber 41 is incident on the incidence slit 51. An exit end of the fiber bundle 40 is arranged along the incidence slit 51. At the exit end, 192 fibers 41 are arranged in a single column along the slit direction. The signal light having passed through the incidence slit 51 is incident on the spectroscopic unit 52.

The spectroscopic unit 52 includes a spectroscopic element such as a diffraction grating or a prism. The spectroscopic unit 52 disperses signal light in a direction which is orthogonal to a slit direction. The two-dimensional array photodetector 53 includes a plurality of light-receiving elements. The plurality of light-receiving elements are arranged in an array shape along the slit direction and a spectroscopic direction. For example, the two-dimensional array photodetector 53 has a CCD (Charge-Coupled Device) camera, a CMOS (Complementary Metal Oxide Semiconductor) sensor, or the like. Note that the slit direction and the spectroscopic direction need not be directions which are orthogonal to each other.

In the light-receiving elements of the two-dimensional array photodetector 53, a single row along the spectroscopic direction indicates a spectral spectrum of signal light from one focal point. For example, a row A, a row B, and a row C shown in FIG. 10 each indicates a spectral spectrum of the signal light from a different focal point. By connecting the optical module 100 and the spectroscope 50 to each other by the fiber bundle 40 in this manner, spectral spectra of beams of the signal light from multiple focal points can be measured in a short period of time. In other words, 192 spectral spectra can be measured at the same time.

Furthermore, a large area can be illuminated uniformly by using a component with high surface accuracy as the optical module 100. For example, metal components obtained by machining a metal material can be used as the first lens array unit 120, the first holder unit 130, the second holder unit 150, the edge filter unit 170, and the second lens array unit 180 shown in FIG. 1. Adopting such a configuration enables the plurality of optical modules 100 to be arranged in an array shape in an accurate manner. In addition, accuracy of installation angles of the dichroic mirrors 140 and the like can be improved. Furthermore, each metal component may be colored black in order to absorb stray light.

In the first lens array unit 120, the first holder unit 130, the second holder unit 150, the edge filter unit 170, and the second lens array unit 180, holes into which fixing bolts or the like is inserted may be formed, for example.

While the dichroic mirrors 140 have been described as being held between the inclined surface 1351 and the inclined surface 1551, beam splitters other than the dichroic mirrors 140 may be held instead. In other words, the beam splitters to be held between the inclined surface 1351 and the inclined surface 1551 need not be configured to branch light in accordance with wavelengths. In other words, irradiating light which a sample is to be irradiated with and signal light from the sample may have the same wavelength as each other. Appropriately setting the transmittance and the reflectance of each beam splitter enables multiple focal points to be illuminated uniformly.

While a configuration in which a sample is irradiated with excitation light from below has been described above, a direction in which irradiating light is incident on the sample is not particularly limited. For example, the optical module 100 may be arranged on an upper side of the sample and the sample may be irradiated with excitation light from above. The multifocal optical apparatus may be applied to apparatuses other than a spectroscopic apparatus. For example, the multifocal optical apparatus may have a photodetector which detects signal light without dispersing the signal light.

Second Embodiment

Figure 11:
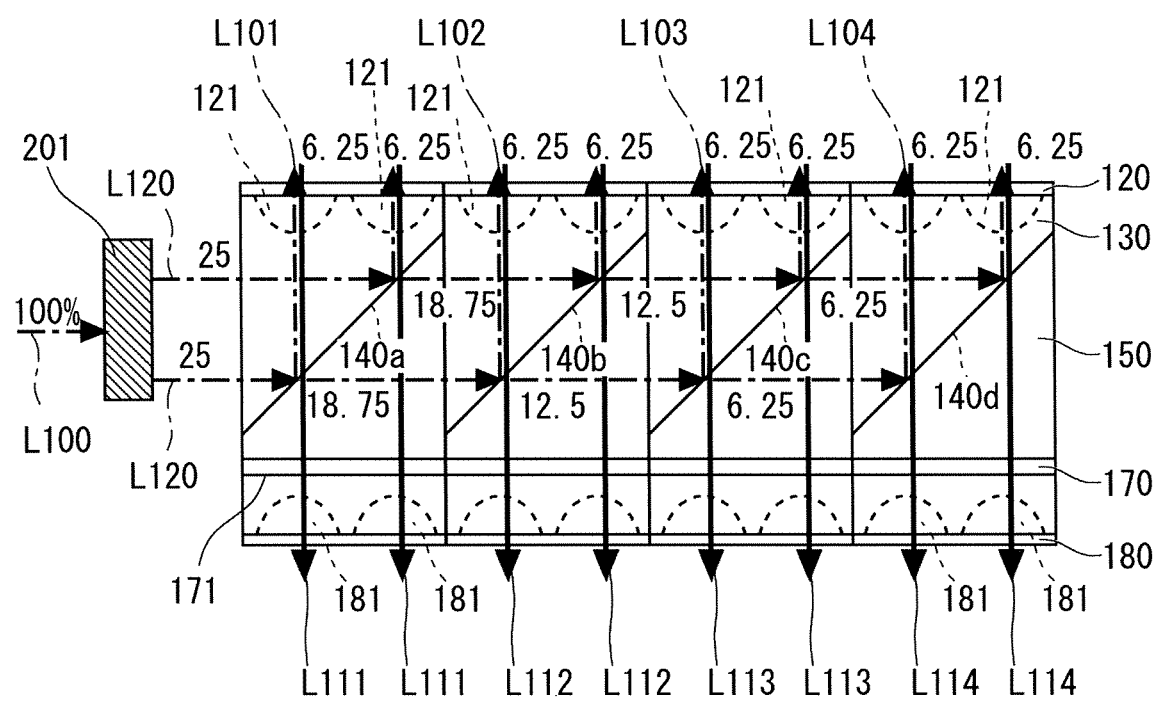
FIG. 11 is a sectional view showing an optical system of an optical module according to a second embodiment.
Figure 12:
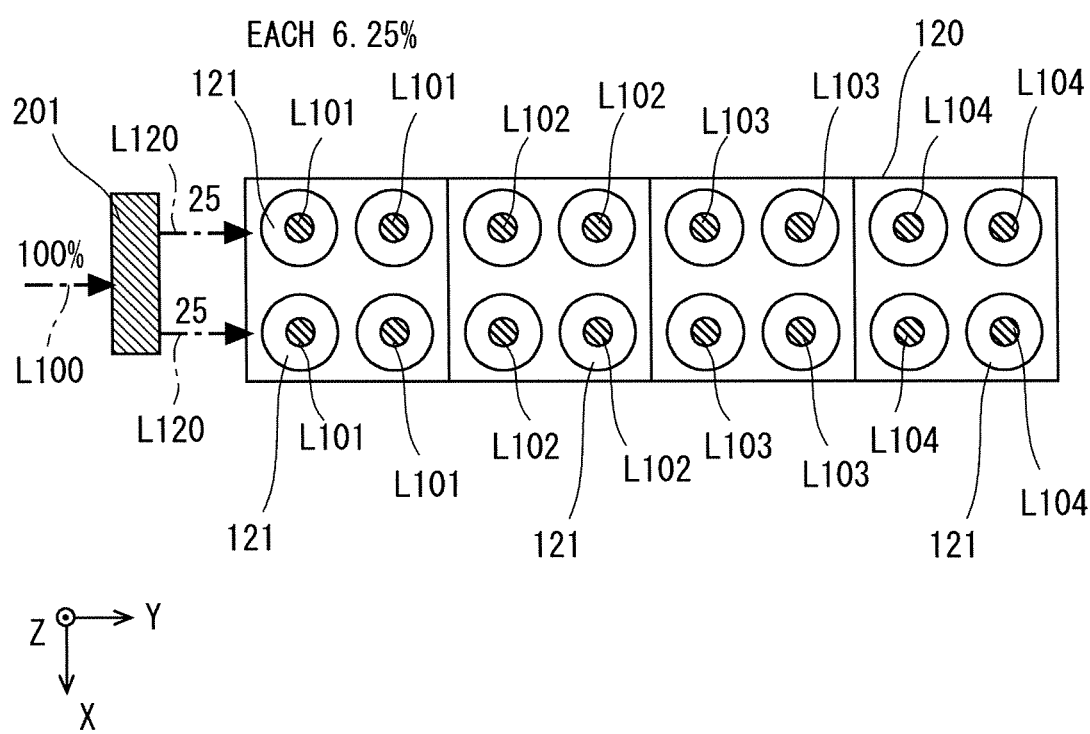
FIG. 12 is a top view showing the optical system of the optical module according to the second embodiment.

A second embodiment is configured in order to increase the number of focal points. The second embodiment will be described with reference to FIG. 11 and FIG. 12. FIG. 11 and FIG. 12 are a sectional view and a top view which schematically show a configuration of an optical module 100 according to the second embodiment. Note that descriptions of contents overlapping with those of the first embodiment described above will be omitted when appropriate.

In the second embodiment, a quarter optical element 201 is added to an incidence side of the optical module 100. The quarter optical element 201 divides excitation light L100 into four sub-beams L120. On an XY plane, the sub-beams L120 are formed in a 2×2 array shape. When an amount of the excitation light L100 is 100%, an amount of light of the sub-beams L120 is 25%.

In addition, the four sub-beams L120 are incident into the optical module 100. Each sub-beam L120 is sequentially incident on the dichroic mirrors 140a to 140d. The dichroic mirrors 140a to 140d reflect the sub-beams L120. The transmittances and the reflectances of the dichroic mirrors 140a to 140d are similar to those in the first embodiment.

In the optical module 100, a lens pair formed by first lenses 121 and second lenses 181 is provided for each sub-beam. As shown in FIG. 12, the four beams of excitation light L101 reflected by the dichroic mirror 140a are respectively incident on different first lenses 121. The four beams of excitation light L102 reflected by the dichroic mirror 140b are respectively incident on different first lenses 121.

An amount of the excitation light at a focal point formed by each of the first lenses 121 is 6.25% (=0.25/4). Beams of signal light L111 to L114 from each focal point are incident on the second lenses 181 via the first lenses 121.

The quarter optical element 201 is arranged on the incidence side of the optical module 100 in this manner. As a result, the number of focal points can be quadrupled. For example, while 96 focal points are formed in the configuration shown in FIG. 8, applying the configuration according to the second embodiment enables 384 focal points to be formed.

It is needless to say that the optical element for dividing the excitation light L100 into sub-beams is not limited to the quarter optical element 201. In other words, an optical element capable of dividing into two or more sub-beams may be arranged on an incidence side of the optical module. In addition, a lens pair formed by the first lenses 121 and the second lenses 181 may be provided for each sub-beam.

In the first embodiment, one dichroic mirror 140 overlaps with one column's worth of the first lenses 121 in an XY plan view. By comparison, in the second embodiment, one dichroic mirror 140 overlaps with two columns of the first lenses 121 in an XY plan view. Therefore, a larger number of focal points can be formed.

First Modified Example

Figure 13:
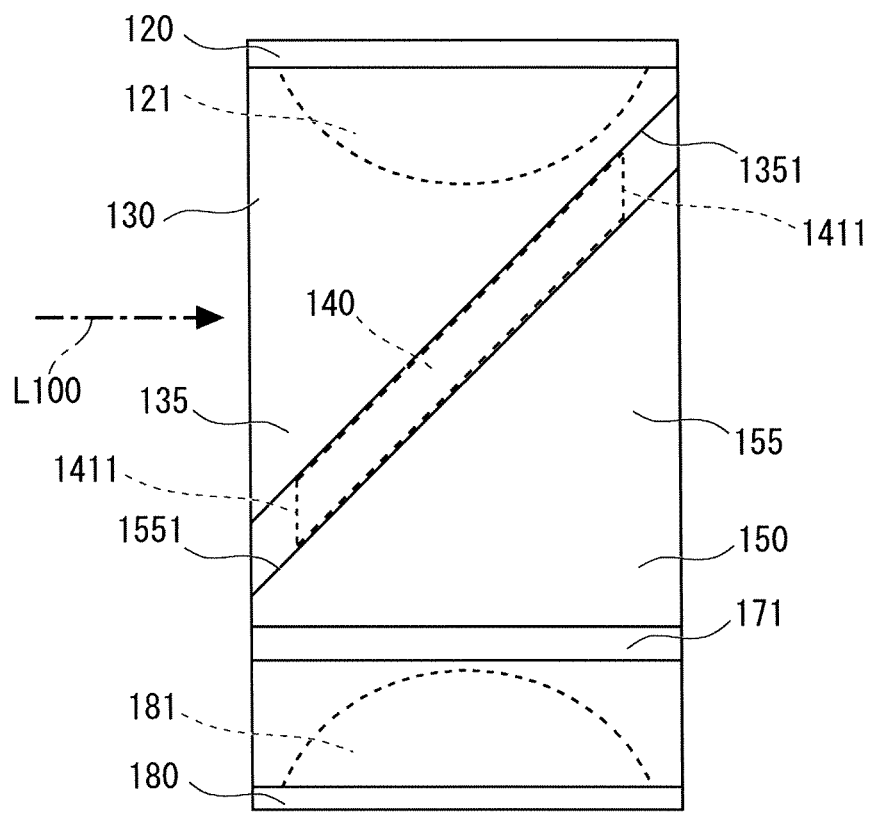
FIG. 13 is a side view schematically showing a configuration of a first modified example.
Figure 13:
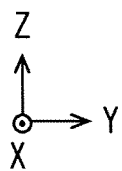

A first modified example will be described with reference to FIG. 13. FIG. 13 is a sectional view schematically showing a configuration with respect to one focal point in the optical module 100. In the first modified example, side end surfaces 1411 of the dichroic mirror 140 have a different shape. Note that the side end surfaces 1411 are surfaces adjacent to an incidence surface on which excitation light is incident.

Edge portions of the dichroic mirror 140 are cut so that the side end surfaces 1411 of the dichroic mirrors 140 are orthogonal to the optical axis of the excitation light L100. In other words, the side end surfaces 1411 are parallel to the XZ plane. Accordingly, optical components can be readily positioned. In addition, space saving can be realized. This is particularly effective when the number of focal points is increased as in the second embodiment.

Second Modified Example

Figure 14:
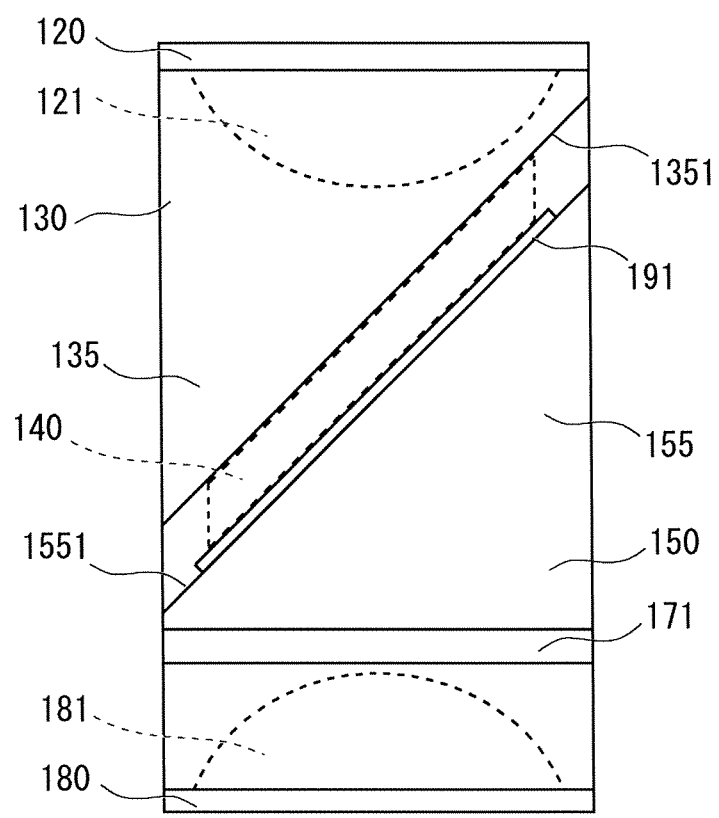
FIG. 14 is a side view schematically showing a configuration of a second modified example.

A second modified example will be described with reference to FIG. 14. FIG. 14 is a sectional view schematically showing a configuration with respect to one focal point in the optical module 100. In the second modified example, an elastic member 191 is added to a lower side of the dichroic mirror 140. The elastic member 191 is arranged between the inclined portion 155 and the dichroic mirror 140. In other words, the elastic member 191 is interposed between the inclined surface 1551 and the dichroic mirror 140.

The elastic member 191 is a leaf spring. Alternatively, resin or rubber can be used as the elastic member 191. The elastic member 191 is formed in a frame shape so as to abut on a peripheral edge portion of the dichroic mirror 140. The elastic member 191 is in contact with the dichroic mirror 140 outside a region on which the excitation light and the signal light are incident. Accordingly, the dichroic mirror 140 can be readily fixed. In other words, the dichroic mirror 140 is fixed by the elastic member 191 at a constant position. As a result, accuracy of the optical system can be improved.

Third Modified Example

Figure 15:
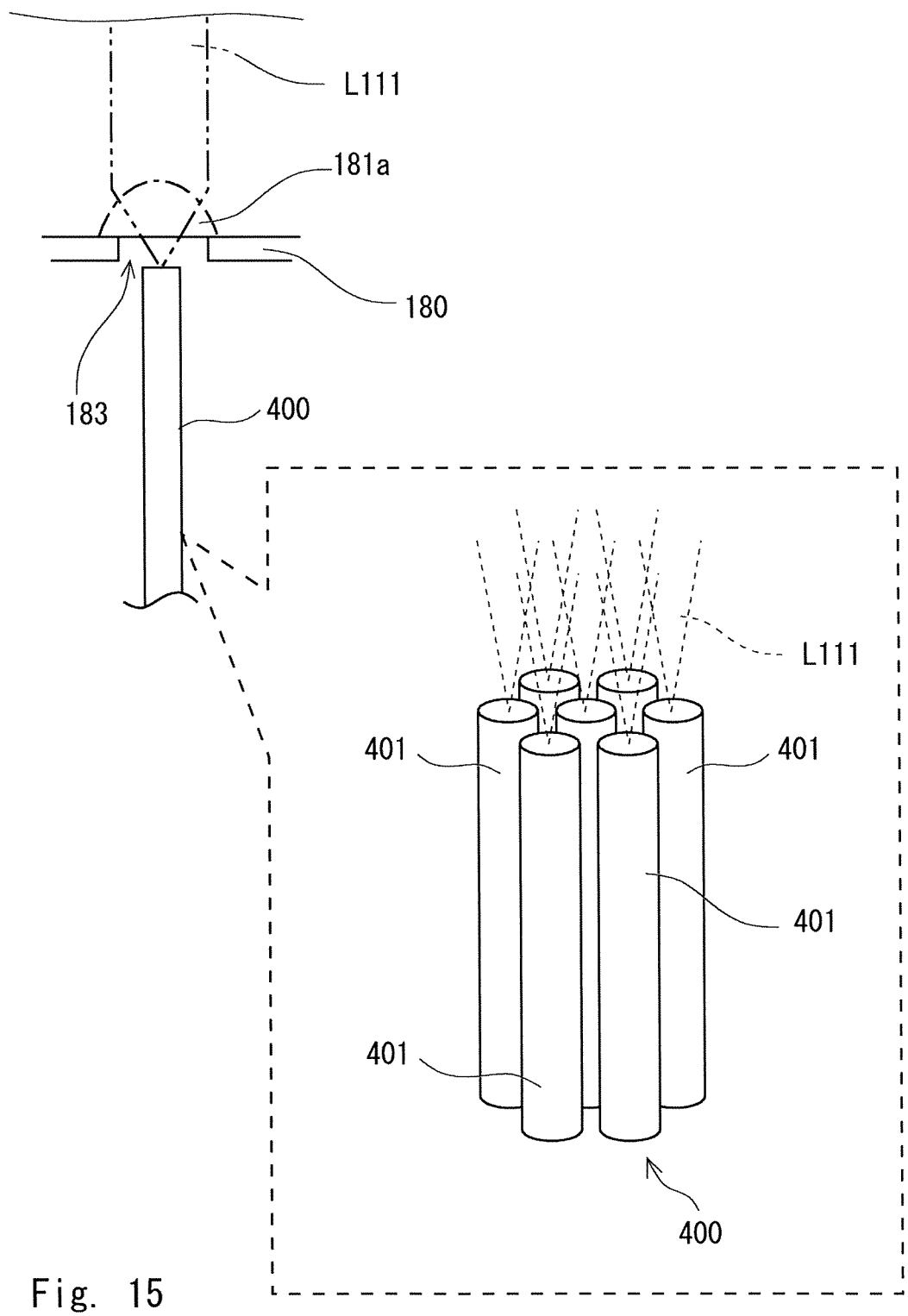
FIG. 15 is a diagram schematically showing a configuration of a third modified example.

A third modified example will be described with reference to FIG. 15. FIG. 15 is a diagram for describing signal light L111 which is collected by the second lenses 181. In the third modified example, the signal light L111 collected by one second lens 181a is focused onto a fiber bundle 400. The fiber bundle 400 has a plurality of fibers 401. The signal light L111 from one focal point is incident on the plurality of fibers 401. Accordingly, an amount of light detected by a spectroscope can be increased.

Fourth Modified Example

Figure 16:
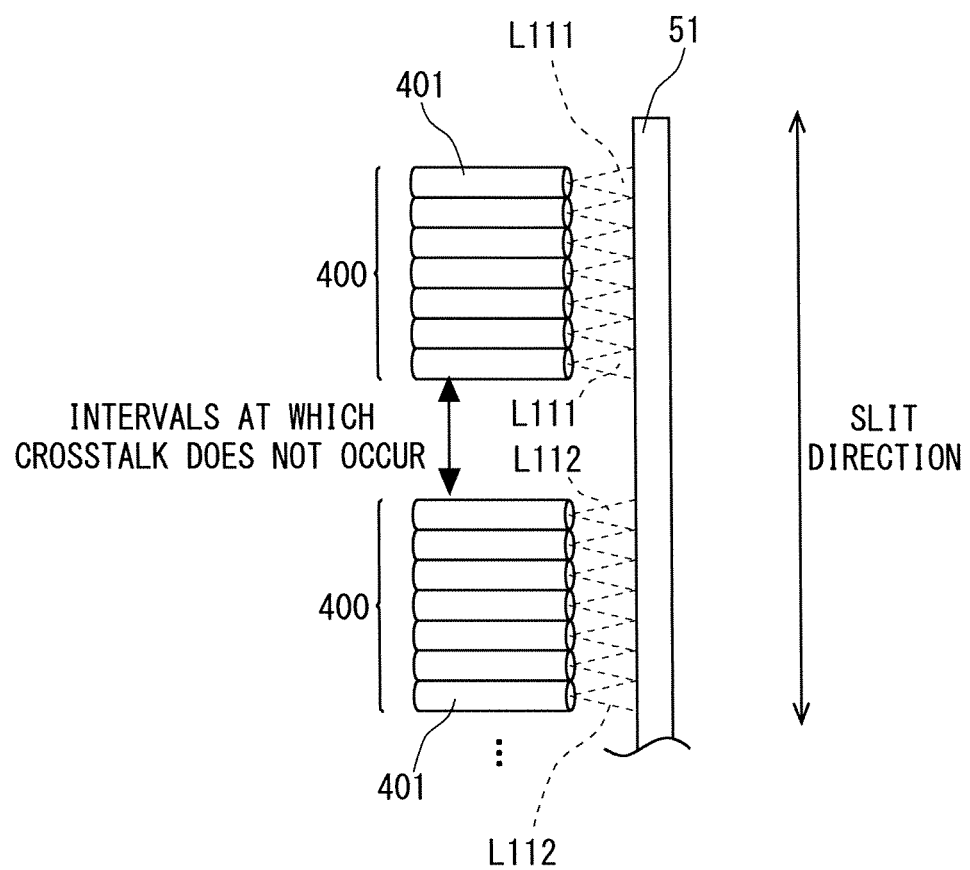
FIG. 16 is a diagram schematically showing a configuration of a fourth modified example.

A fourth modified example is a diagram schematically showing an exit end side of the fiber bundle 400 according to the third modified example. The fourth modified example will be described with reference to FIG. 16. Two fiber bundles 400 are shown in FIG. 16. One fiber bundle 400 propagates signal light from one second lens 181. In other words, the two fiber bundles 400 propagate beams of the signal light generated at different focal points. Beams of the signal light L111 and L112 emitted from the exit ends of the fiber bundles 400 are incident on the incidence slit 51.

The exit ends of the fibers 401 are arranged in a single column along the slit direction. In addition, between different fiber bundles 400, exit ends of the fibers 401 are arranged at intervals in order to avoid crosstalk. In other words, the two fiber bundles 400 are arranged so as to be separated from each other on the exit end side in order to prevent the signal light L111 and the signal light L112 from being detected by a same light-receiving element. In one fiber bundle 400, exit ends of the fibers 401 are arranged without intervals. Accordingly, since crosstalk can be suppressed, detection accuracy can be improved. An arrangement of the exit ends of the fibers 401 is not limited to a single column and the exit ends may be arranged in a plurality of columns. In other words, the exit ends of the fibers 401 need only be arranged along the slit direction.

Fifth Modified Example

Figure 17:
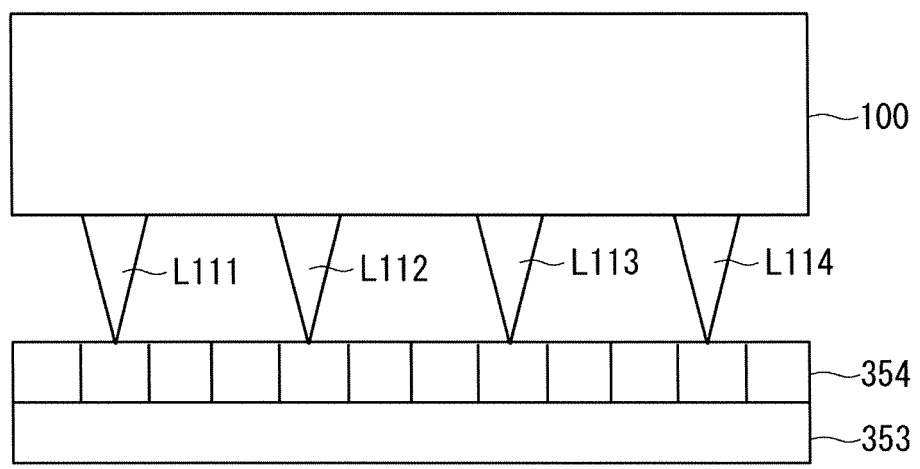
FIG. 17 is a diagram schematically showing a configuration of a fifth modified example.
Figure 17:
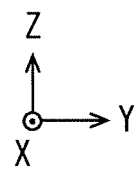

A fifth modified example adopts a configuration of detecting the signal light from the optical module 100 without using a fiber bundle 400. Specifically, as shown in FIG. 17, a two-dimensional photodetector 353 is arranged so as to oppose the optical module 100. The two-dimensional photodetector 353 is a camera having light-receiving elements 354 arranged in an array shape. In other words, the light-receiving elements 354 are arranged along the X direction and the Y direction so that each light-receiving element 354 opposes each second lens 181. In addition, each light-receiving element 354 is arranged at a focusing position in the second lens 181 (not illustrated in FIG. 17). Therefore, the light-receiving elements 354 become pixels for detecting the beams of the signal light L111 to L114 collected by the second lenses 181. Accordingly, the signal light generated at a different focal point can be independently detected.

In addition, while the optical module 100 and the two-dimensional photodetector 353 are arranged so as to oppose each other in FIG. 17, a mirror may be interposed between the optical module 100 and the two-dimensional photodetector 353. In other words, the beams of signal light L111 to L114 from the optical module 100 may be incident on the two-dimensional photodetector 353 after being reflected by the mirror. Alternatively, a small light-receiving element 354 such as a photodiode may be arranged in a two-dimensional matrix shape.

Sixth Modified Example

Figure 18:
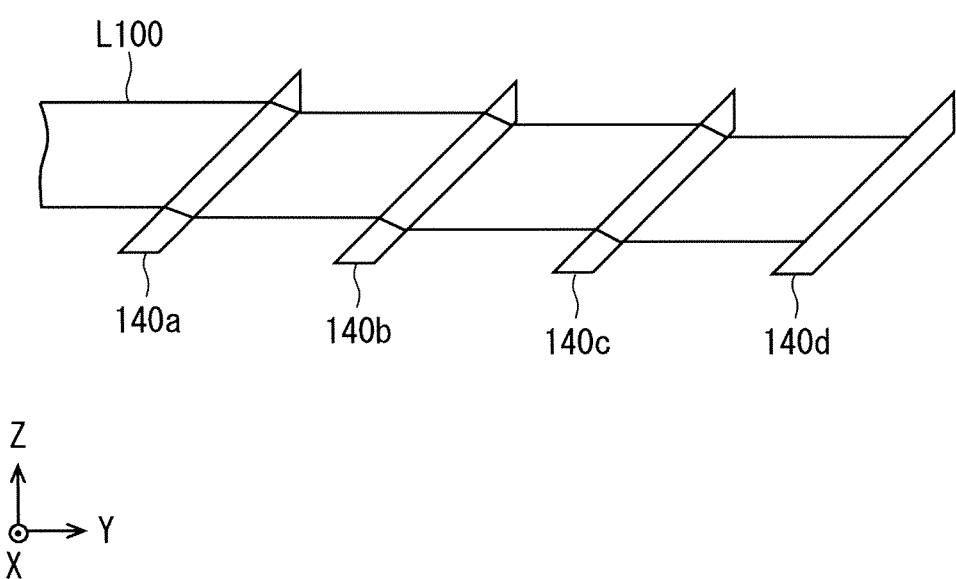
FIG. 18 is a diagram schematically showing a configuration of a sixth modified example.
Figure 19:
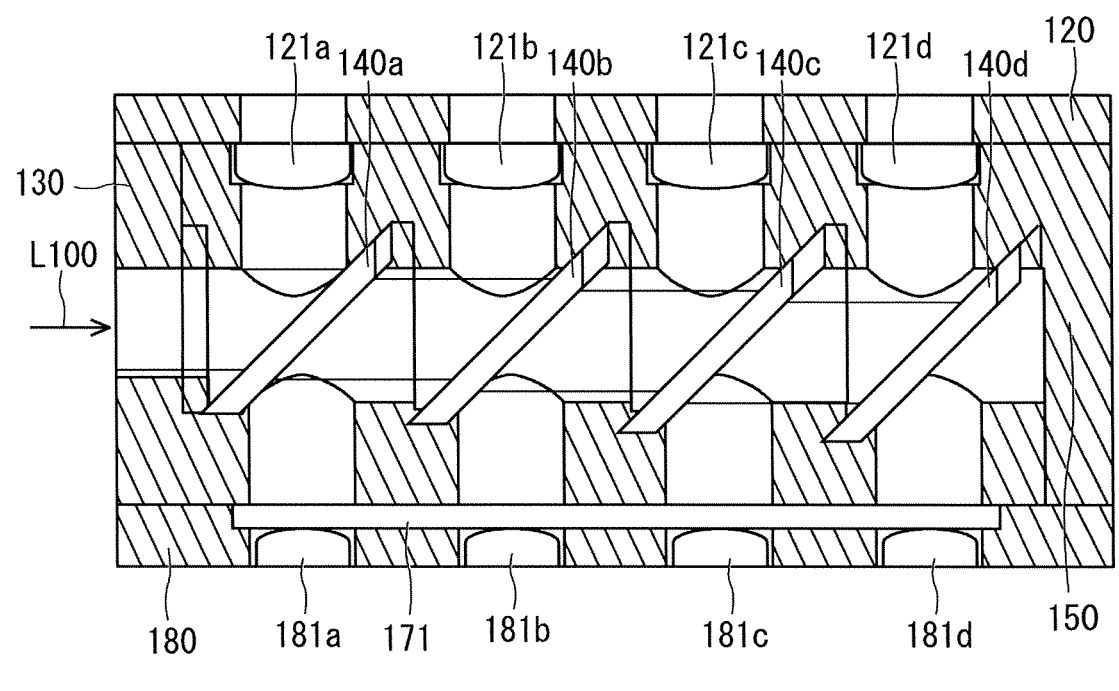
FIG. 19 is a diagram schematically showing a configuration of the sixth modified example.

A sixth modified example will be described with reference to FIG. 18 and FIG. 19. FIG. 18 is a diagram for describing an optical path of excitation light L100 which passes through a plurality of dichroic mirrors 140. FIG. 19 is a diagram showing an arrangement of the plurality of dichroic mirrors 140 when taking a shift of the optical path into consideration. Since a basic configuration of the optical module 100 is similar to that described above, a description will be omitted.

Every time the excitation light L100 is transmitted through the dichroic mirrors 140, the excitation light L100 is refracted due to a difference in refractive indices between air and the dichroic mirrors 140. Therefore, as shown in FIG. 18, every time the excitation light L100 is transmitted through the dichroic mirrors 140, the optical path of the excitation light L100 shifts in the −Z direction. Accordingly, in the sixth modified example, the dichroic mirrors 140 are arranged in consideration of an amount of shift by refraction.

Specifically, as shown in FIG. 19, Z positions of the dichroic mirror 140a, the dichroic mirror 140b, the dichroic mirror 140c, and the dichroic mirror 140d are gradually shifted. Among the dichroic mirrors 140a to 140d, the dichroic mirror 140a is arranged farthest on the +Z side while the dichroic mirror 140d is arranged farthest on the −Z side. The dichroic mirror 140b is arranged more toward the −Z side than the dichroic mirror 140a but arranged more toward the +Z side than the dichroic mirror 140c. In this manner, the dichroic mirror 140 which is arranged farthest on the +Y side is arranged farthest on the −Z side.

In the travel direction of the excitation light L100 (the +Y direction), the dichroic mirror 140a on the nearest side is closest to the first lens 121a and the more toward the far side, the farther the dichroic mirrors 140 are from the first lens 121d.

In addition, the first holder unit 130 and the second holder unit 150 are designed so that optical paths in the dichroic mirrors 140a to 140d are shifted in the +Z direction. Specifically, positions of the opening portion 156, the excitation light opening 1562, the opening portion 136, the excitation light opening 1362, and the like shown in FIG. 1, FIG. 5, and the like may be shifted. The opening portion 156, the excitation light opening 1562, the opening portion 136, the excitation light opening 1362, and the like are arranged so that an optical path from the dichroic mirror 140b to the dichroic mirror 140c shifts more toward the −Z side than an optical path from the dichroic mirror 140a to the dichroic mirror 140b. Furthermore, the opening portion 156, the excitation light opening 1562, the opening portion 136, the excitation light opening 1362, and the like are arranged so that an optical path from the dichroic mirror 140c to the dichroic mirror 140d shifts more toward the −Z side than an optical path from the dichroic mirror 140b to the dichroic mirror 140c. Accordingly, the excitation light L100 can be guided more appropriately.

In addition, optical paths of signal light from the first lenses 121 toward the second lenses 181 are similarly shifted due to refraction. Therefore, the signal light opening 1561, the signal light opening 1361, and the like may be arranged so that an optical path of signal light from the first lenses 121 toward the dichroic mirrors 140 is more toward the −Y side than an optical path of signal light from the dichroic mirrors 140 toward the second lenses 181.

Seventh Modified Example

As described above, every time the excitation light L100 is transmitted through the dichroic mirrors 140, the excitation light L100 is refracted due to a difference in refractive indices between air and the dichroic mirrors 140. Therefore, in the seventh modified example, an incidence direction of the excitation light L100 is inclined so as to cancel a shift due to refraction of the excitation light L100 when passing through the dichroic mirrors 140. This point will be described with reference to FIG. 20.

Figure 20:
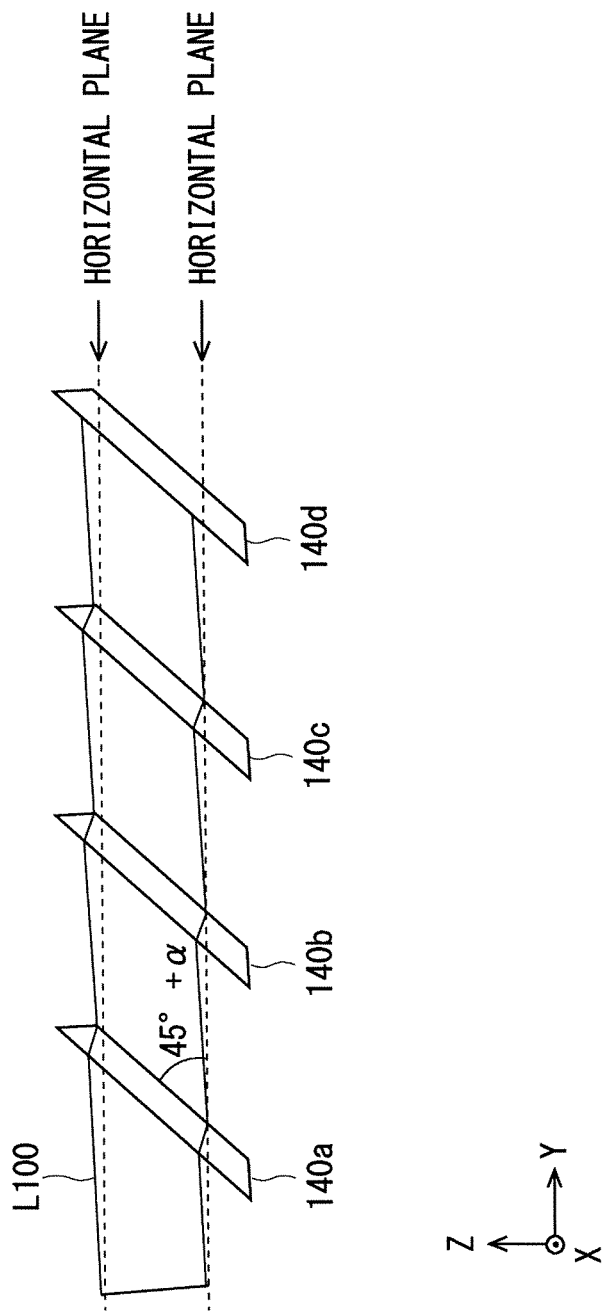
FIG. 20 is a diagram schematically showing a configuration of a seventh modified example.

In FIG. 20, the optical axis of the excitation light L100 which propagates along the Y direction is slightly inclined in the +Z direction. In other words, the excitation light L100 travels in the +Y direction and the +Z direction. Specifically, when assuming that the XY plane is a horizontal plane, the excitation light L100 is caused to be diagonally incident due to deviating from a horizontal direction. An angle of incidence of the excitation light L100 is determined based on a beam shift amount due to refraction, intervals of wells (for example, 9 mm intervals when there are 96 wells), and a thickness and a refractive index of a filter.

In this manner, by causing the excitation light L100 to be diagonally incident, positions in the Z direction (heights) of the dichroic mirrors 140 can be made the same. The inclination angle of the dichroic mirrors 140 with respect to the XY plane (horizontal plane) is arranged to be larger than 45 degrees. In other words, as shown in FIG. 20, in a YZ plan view, the inclination angle of the dichroic mirrors 140 is set to an angle expressed as 45°+a (where a is a positive value) from the Y direction. In addition, a design is adopted in which the inclination angle (45°+a) includes the wavelength characteristics of reflectance and transmittance of the dichroic mirrors 140 described earlier.

Other Embodiments

An incident beam width may be made smaller than a detected beam width. Accordingly, an effective NA upon incidence can be set low but an effective NA upon detection can be set high. Therefore, a larger amount of light can be collected. For example, a beam width can be set according to a size of the opening portions 156.

In an XZ plan view, the excitation light opening 1562 may be made smaller than the signal light opening 1561. Accordingly, diffraction is reset and excitation conditions of beams can be readily made uniform.

In addition, utilization of DLS (dynamic light scattering) or the like to dark-field measurement can also be performed.

The optical module 100 can be imparted with a function of a spatial filter for limiting an incidence position of the excitation light L100 and the like. Accordingly, dark-field measurement of multiple focal points can be performed.

By installing a prism in each well and performing total reflection illumination, the embodiment can be used as a multifocal SPR (surface plasmon resonance) sensor.

An illumination region can be controlled by arranging a lens at an entrance of each well at, for example, a position of the laser line filters 141. By spatially displacing a region to be illuminated by excitation light and a region to be detected by a detector on the sample, the embodiment can also be used in spatial offset Raman spectroscopy of multiple focal points.

While an invention made by the present inventors has been described using specific terms based on embodiments, it is to be understood that the present invention is not limited to the embodiments described above and that various changes and modifications can be made without departing from the spirit and scope of the invention.

The present application claims priority on the basis of Japanese Patent Application No. 2020-212034 filed on Dec. 22, 2020, the entire contents of which are incorporated herein by reference.

REFERENCE SIGNS LIST

1 MULTIFOCAL OPTICAL APPARATUS
11 LIGHT SOURCE
12 LIGHT SOURCE
40 FIBER BUNDLE
41 FIBER
50 SPECTROSCOPE
51 INCIDENCE SLIT
52 SPECTROSCOPIC UNIT
53 TWO-DIMENSIONAL ARRAY PHOTODETECTOR
100 OPTICAL MODULE
110 MULTIWELL PLATE
111 WELL
120 FIRST LENS ARRAY UNIT
121 FIRST LENS
122 HOLDING PLATE
130 FIRST HOLDER UNIT
131 SIDE WALL
132 BASE PORTION
135 INCLINED PORTION (FIRST INCLINED PORTION)
1351 INCLINED SURFACE (FIRST INCLINED SURFACE)
1352 HOLDING SURFACE (FIRST HOLDING SURFACE)
136 OPENING PORTION
1361 SIGNAL LIGHT OPENING
1362 EXCITATION LIGHT OPENING
140 DICHROIC MIRROR
141 LASER LINE FILTER
150 SECOND HOLDER UNIT
151 SIDE WALL
152 BASE PORTION
153 INCIDENCE OPENING
155 INCLINED PORTION (SECOND INCLINED PORTION)
1551 INCLINED SURFACE (SECOND INCLINED SURFACE)
1552 HOLDING SURFACE (SECOND HOLDING SURFACE)
156 OPENING PORTION

1561 SIGNAL LIGHT OPENING
1562 EXCITATION LIGHT OPENING
1571 FILTER HOLDING PORTION
1572 MIRROR HOLDING PORTION
170 EDGE FILTER UNIT
171 EDGE FILTER
172 HOLDING PLATE
173 THROUGH HOLE
180 SECOND LENS ARRAY UNIT
181 SECOND LENS
182 HOLDING BLOCK
183 THROUGH HOLE
191 ELASTIC MEMBER

The invention claimed is:

1. An optical module for forming multiple focal points arranged in first and second directions, the optical module comprising:
   a first lens array unit in which a plurality of first lenses configured to collect irradiating light are arranged in the first and second directions in order to form the multiple focal points for an observation;
   a second lens array unit which includes a plurality of second lenses arranged in the first and second directions and on which signal light from the first lenses is incident;
   a plurality of beam splitters which are arranged between the first lens array unit and the second lens array unit and which are configured to reflect irradiating light traveling in the second direction to the first lenses and to transmit the signal light from the first lenses;
   a first holder unit arranged between the plurality of beam splitters and the first lens array unit; and
   a second holder unit arranged between the plurality of beam splitters and the second lens array unit, wherein
   the plurality of beam splitters are dichroic mirrors arranged so that the irradiating light traveling in the second direction is sequentially incident on the plurality of beam splitters,
   each of the beam splitters is arranged to be inclined with respect to an optical axis of the irradiating light,
   the first holder unit and the second holder unit are configured to hold the plurality of beam splitters,
   in a plan view in a plane including the first and second directions, one of the beam splitters overlaps with the first lenses arranged in one column along the first direction,
   a wavelength of the signal light is different from that of the irradiating light,
   the beam splitter transmits the signal light so that the beam splitter separates optical paths of the irradiation light and the signal light in accordance with the wavelength, and
   reflectance of the beam splitter in a wavelength of the irradiating light on a nearest side in a travel direction of the irradiating light is set lowest and the more toward a far side in the travel direction, the higher the reflectance of the beam splitters in the wavelength of the irradiating light,
   the first holder unit includes a plurality of first inclined portions having a first inclined surface along the beam splitters,
   the second holder unit includes a plurality of second inclined portions having a second inclined surface along the beam splitters,
   the beam splitters are held between the first inclined surface and the second inclined surface,
   the first holder unit includes a first incident opening formed along the second direction,
   the first holder unit includes a first signal light opening arranged between the first lens and the beam splitter,
   the second holder unit includes a second incident opening formed along the second direction,
   the second holder unit includes a second signal light opening arranged between the second lens and the beam splitter, and
   the signal light passes through the first signal light opening and the second signal light opening.

2. The optical module according to claim 1, wherein
   the first inclined portion has a first holding surface which is a different surface from the first inclined surface,
   the second inclined portion has a second holding surface which is a different surface from the second inclined surface, and
   a laser light filter configured to transmit a laser light that is the irradiating light is held between the first holding surface and the second holding surface.

3. The optical module according to claim 2, further comprising an elastic member arranged between the first inclined surface or the second inclined surface and the beam splitters.

4. The optical module according to claim 1, wherein an edge portion of the beam splitters is cut so that a side end surface of the beam splitters becomes orthogonal to the second direction.

5. The optical module according to claim 1, wherein the beam splitter on a nearest side in the travel direction of the irradiating light is closest to the first lenses and the more toward a far side in the travel direction, the more distant the beam splitters become from the first lenses.

6. The optical module according to claim 1, wherein each of the first lenses collects the irradiating light in order to form a focal point on a sample,
   the signal light from the focal point on the sample is incident on the beam splitter through the first lens, and
   the signal light transmitted through the beam splitter is incident on the second lens.

7. The optical module according to claim 1, the optical module further comprising:
   an edge filter unit disposed between the second holder unit and the second lens array unit and having an edge filter on which the signal light transmitted through the beam splitter is incident; wherein
   the irradiating light being incident on the beam splitter is a parallel beam and the signal light being incident on the second lens is a parallel beam.

8. An optical module, comprising:
   a first module; and
   a second module,
   wherein the first and second modules are the optical module according to claim 1, and incident directions of the irradiating light are opposite in the first and second module.

9. A multifocal optical apparatus, comprising:
   the optical module according to claim 1;
   a light source configured to generate the irradiating light; and
   a fiber bundle having a plurality of fibers on which signal light collected by the second lenses is incident.

10. A multifocal optical apparatus, comprising:
    the optical module according to claim 1;
    a light source configured to generate the irradiating light; and a two-dimensional array photodetector configured to detect signal light collected by the second lenses.

11. A multifocal optical apparatus, comprising:
a light source configured to generate irradiating light; and
a first module configured to form multiple focal points arranged in first and second directions using the irradiating light, wherein
the first module includes:
a first lens array unit in which a plurality of first lenses configured to collect irradiating light are arranged in the first and second directions in order to form the multiple focal points for observation;
a second lens array unit which includes a plurality of second lenses arranged in the first and second directions and which is configured to collect signal light incident from the first lenses;
a plurality of beam splitters which are arranged between the first lens array unit and the second lens array unit and which are configured to reflect irradiating light traveling in the second direction to the first lenses and to transmit the signal light from the first lenses;
a first holder unit arranged between the plurality of beam splitters and the first lens array unit; and
a second holder unit arranged between the plurality of beam splitters and the second lens array unit, wherein
the plurality of beam splitters being arranged so that the irradiating light traveling in the second direction is sequentially incident on the plurality of beam splitters,
each of the beam splitters being arranged to be inclined with respect to an optical axis of the irradiating light, in a plan view in a plane including the first and second directions, one of the beam splitters overlaps with the first lenses arranged in one column along the first direction, the beam splitter transmits the signal light so that the beam splitter separates optical paths of the irradiation light and the signal light in accordance with the wavelength, and
reflectance of the beam splitter in a wavelength of the irradiating light on a nearest side in a travel direction of the irradiating light being set lowest and the more toward a far side in the travel direction, the higher the reflectance of the beam splitters in the wavelength of the irradiating light,
the first holder unit includes a plurality of first inclined portions having a first inclined surface along the beam splitters,
the second holder unit includes a plurality of second inclined portions having a second inclined surface along the beam splitters,
the beam splitters are held between the first inclined surface and the second inclined surface,
the first holder unit includes a first incident opening formed along the second direction,
the first holder unit includes a first signal light opening arranged between the first lens and the beam splitter,
the second holder unit includes a second incident opening formed along the second direction,
the second holder unit includes a second signal light opening arranged between the second lens and the beam splitter, and
the signal light passes through the first signal light opening and the second signal light opening.

12. The multifocal optical apparatus according to claim 11, comprising:
a laser light filter arranged between adjacent beam splitters, wherein
the laser light filter is configured to transmit laser light which is the irradiating light.

13. The multifocal optical apparatus according to claim 11, further comprising:
a fiber bundle having a plurality of fibers on which signal light from the first module is incident, wherein
signal light collected by one of the second lenses is incident on the plurality of fibers.

14. The multifocal optical apparatus according to claim 13, wherein the plurality of fibers configured to propagate signal light collected by different second lenses are arranged at intervals.

15. The multifocal optical apparatus according to claim 13, comprising:
a spectroscope configured to disperse and detect signal light emitted from the fiber bundle,
the spectroscope including an incidence slit,
a spectroscopic unit configured to disperse the signal light having passed through the incidence slit, and
a two-dimensional array photodetector configured to detect the signal light having been dispersed by the spectroscopic unit, wherein
the fibers are arranged along a longitudinal direction of the incidence slit located at an exit end of the fiber bundle.

16. The multifocal optical apparatus according to claim 11, further comprising a two-dimensional array photodetector in which light-receiving elements configured to detect signal light collected by the second lenses are arranged.

17. The multifocal optical apparatus according to claim 11, wherein
the light source is provided in plurality, and
the irradiating light from the plurality of light sources is caused to be incident on an incidence opening of the first module.

18. The multifocal optical apparatus according to claim 11, wherein each of the first lenses collects the irradiating light in order to form a focal point on a sample,
the signal light from the focal point on the sample is incident on the beam splitter through the first lens, and
the signal light transmitted through the beam splitter is incident on the second lens.

19. The multifocal optical apparatus according to claim 11, the optical module further comprising:
an edge filter unit disposed between the plurality of beam splitters and the second lens array unit and having an edge filter on which the signal light transmitted through the beam splitter is incident;
the irradiating light being incident on the beam splitter is a parallel beam and the signal light being incident on the second lens is a parallel beam.

20. The multifocal optical apparatus according to claim 11, further comprising:
a second module,
the second module includes:
a first lens array unit in which a plurality of first lenses configured to collect irradiating light are arranged in the first and second directions in order to form the multiple focal points;
a second lens array unit which includes a plurality of second lenses arranged in the first and second directions and which is configured to collect signal light incident from the first lenses; and
a plurality of beam splitters which are arranged between the first lens array unit and the second lens array unit and which are configured to reflect irradiating light traveling in the second direction to the first lenses and to transmit the signal light from the first lenses;

the plurality of beam splitters being arranged so that the irradiating light traveling in the second direction is sequentially incident on the plurality of beam splitters, each of the beam splitters being arranged to be inclined with respect to an optical axis of the irradiating light, in a plan view in a plane including the first and second directions, one of the beam splitters overlaps with the first lenses arranged in one column along the first direction, the beam splitter transmits the signal light so that the beam splitter separates optical paths of the irradiation light and the signal light in accordance with the wavelength, and reflectance of the beam splitter in a wavelength of the irradiating light on a nearest side in a travel direction of the irradiating light being set lowest and the more toward a far side in the travel direction, the higher the reflectance of the beam splitters in the wavelength of the irradiating light, and wherein incident directions of the irradiating light are opposite in the first and second module.

\* \* \* \* \*